(12) United States Patent
Zheng et al.

(10) Patent No.: US 11,510,275 B2
(45) Date of Patent: Nov. 22, 2022

(54) CONFIGURATION METHOD FOR DISCONTINUOUS RECEPTION PARAMETERS, TERMINAL AND NETWORK-SIDE DEVICE

(71) Applicant: VIVO MOBILE COMMUNICATION CO., LTD., Guangdong (CN)

(72) Inventors: Qian Zheng, Guangdong (CN); Jing Liang, Guangdong (CN); Li Chen, Guangdong (CN); Yumin Wu, Guangdong (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 159 days.

(21) Appl. No.: 16/623,173

(22) PCT Filed: Jun. 12, 2018

(86) PCT No.: PCT/CN2018/090794
§ 371 (c)(1),
(2) Date: Dec. 16, 2019

(87) PCT Pub. No.: WO2018/228364
PCT Pub. Date: Dec. 20, 2018

(65) Prior Publication Data
US 2021/0014928 A1     Jan. 14, 2021

(30) Foreign Application Priority Data
Jun. 15, 2017   (CN) .......................... 201710453651.X

(51) Int. Cl.
*H04W 76/28*     (2018.01)
*H04W 76/27*     (2018.01)
(Continued)

(52) U.S. Cl.
CPC .......... *H04W 76/28* (2018.02); *H04W 36/08* (2013.01); *H04W 68/005* (2013.01); *H04W 74/0833* (2013.01); *H04W 76/27* (2018.02)

(58) Field of Classification Search
CPC ..... H04W 76/28; H04W 76/27; H04W 36/08; H04W 68/005; H04W 74/0833;
(Continued)

(56) References Cited

U.S. PATENT DOCUMENTS

2011/0305215 A1   12/2011   Hofmann et al.
2015/0327323 A1   11/2015   Wang
(Continued)

FOREIGN PATENT DOCUMENTS

| CN | 102300294 A | 12/2011 |
| CN | 103841594 A | 6/2014 |

(Continued)

OTHER PUBLICATIONS

KR-10-2017-0026682_EngKorTransl (English—Korean Translated) (Year: 2017).*
(Continued)

*Primary Examiner* — Chi H Pham
*Assistant Examiner* — Ji-Hae Yea
(74) *Attorney, Agent, or Firm* — Maschoff Brennan

(57) ABSTRACT

A method of configuring a discontinuous reception DRX parameter, a terminal and a network side device are provided. The method includes receiving a message transmitted by a network side device; and acquiring, from the message, an inactive-state DRX parameter configured by the network side device for the terminal.

11 Claims, 11 Drawing Sheets

(51) Int. Cl.
*H04W 36/08* (2009.01)
*H04W 68/00* (2009.01)
*H04W 74/08* (2009.01)

(58) Field of Classification Search
CPC . H04W 24/02; H04W 52/02; H04W 52/0212; Y02D 30/70
See application file for complete search history.

(56) References Cited

U.S. PATENT DOCUMENTS

| | | | |
|---|---|---|---|
| 2016/0227459 A1* | 8/2016 | Fujishiro | H04W 36/0069 |
| 2018/0146467 A1* | 5/2018 | Kim | H04W 80/02 |

FOREIGN PATENT DOCUMENTS

| | | | | |
|---|---|---|---|---|
| CN | 103889039 A | | 6/2014 | |
| CN | 103945505 A | | 7/2014 | |
| KR | 10-2017-0026682 | * | 2/2017 | H04W 80/02 |
| WO | 2018228364 A1 | | 12/2018 | |

OTHER PUBLICATIONS

R2-1706053 ("LS to SA2 and RAN3 on RAN2 agreements on NR paging", 3GPP TSG RAN WG2 Meeting #98, R2-1706053, May 15-19, 2017) (Year: 2017).*
Ericsson ("Periodic RAN area updates in RRC_Inactive", 3GPP TSG-RAN WG2 #98, R2-1704121, May 15-19, 2017) (Year: 2017).*
Intel Corporation ("RAN-initiated notification and RAN configured DRX", 3GPP TSG RAN WG2 NR adhoc meeting, R2-1700332, Jan. 17-19, 2017) (Year: 2017).*
Translation of International Search Report, dated Sep. 3, 2018, for PCT/CN2018/090794, International Filing Date of Jun. 12, 2018, consisting of 2 Pages.
Extended European Search Report, dated Jun. 3, 2020, for PCT/CN2018/090794, International Filing Date of Jun. 12, 2018, consisting of 11 Pages.
International Preliminary Report on Patentability and Translation of International Preliminary Report on Patentability, dated Dec. 17, 2019, for PCT/CN2018/090794, International Filing Date of Jun. 12, 2018, consisting of 5 Pages.
Translation of Written Opinion, dated Sep. 3, 2018, for PCT/CN2018/090794, International Filing Date of Jun. 12, 2018, consisting of 5 Pages.
Written Opinion, dated Sep. 3, 2018, for PCT/CN2018/090794, International Filing Date of Jun. 12, 2018, consisting of 4 Pages.
International Search Report, dated Sep. 3, 2018, for PCT/CN2018/090794, International Filing Date of Jun. 12, 2018, consisting of 3 Pages.
Vivo, "DRX Configuration for Inactive UE," 3GPP TSG-RAN WG2, Meeting #99, Aug. 21-25, 2017, Berlin, Germany, consisting of 4 Pages.
Ericsson, "Further considerations on RAN and CN paging in Inactive," 3GPP TSG-RAN WG2, Meeting #98, May 15-19, 2017, Hangzhou, China, consisting of 6 Pages.
Interdigital Communications, "RAN Paging in the Inactive State," 3GPP TSG-RAN WG2 NR Ad Hoc, Jan. 17-19, 2017, Spokane, Washington, USA, consisting of 3 Pages.
Ntel Corporation, "RAN-initiated notification and RAN configured DRX," 3GPP TSG RAN WG2 NR adhoc meeting, Jan. 17-19, 2017, Spokane, Washington, USA, consisting of 3 Pages.
Nokia, Alcatel-Lucent Shanghai Bell, "DRX Principles for NR," 3GPP TSG-RAN WG2, Meeting #96, Nov. 14-18, 2016, Reno, Nevada, USA, consisting of 5 Pages.
Ericsson, "Connected Mode DRX for NB-IoT," 3GPP TSG-RAN WG2, Meeting NB-IOT ad-hoc, Jan. 19-21, 2016, Budapest, Hungary, consisting of 7 Pages.
First Office Action, dated Nov. 25, 2019, for CN 201710453651.X, Priority date of Jun. 15, 2017, consisting of 7 Pages.
Translation of First Office Action, dated Nov. 25, 2019, for CN 201710453651.X, Priority date of Jun. 15, 2017, consisting of 6 Pages.
Ericsson, "DRX in idle and RRC_Inactive state," 3GPP TSG-RAN WG2, Meeting #96, Nov. 14-18, 2016, Reno, Nevada, USA, consisting of 4 Pages.
TSG RAN WG2, "LS to SA2 and RAN3 on RAN2 agreements on NR paging," 3GPP TSG RAN WG2, Meeting #98, May 15-19, 2017, Hangzhou, China, consisting of 1 Page.

* cited by examiner

CONFIGURATION METHOD FOR DISCONTINUOUS RECEPTION PARAMETERS, TERMINAL AND NETWORK-SIDE DEVICE

CROSS-REFERENCE TO RELATED APPLICATION

This application is a U.S. national phase application of a PCT Application No. PCT/CN2018/090794 filed on Jun. 12, 2018, which claims priority to a Chinese Patent Application No. 201710453651.X filed in China on Jun. 15, 2017, the disclosures of which are incorporated in their entireties by reference herein.

TECHNICAL FIELD

The present disclosure relates to the field of communication technology, and in particular, relates to a method of configuring a discontinuous reception (DRX) parameter, a terminal and a network side device.

BACKGROUND

In a Long Term Evolution (LTE) system, a Discontinuous reception (DRX) mechanism is defined for a Radio Resource Control Idle (RRC idle) state and a RRC connected (RRC connected) stated. In the DRX of a User Equipment (UE) in an idle state, that is, in a Core Network paging (CN paging) process, a base station configures a common DRX cycle (for example, a cell broadcasted DRX cycle) for the UE by using a system message, DRX cycles for all UEs in the idle state in a same cell are the same. Regarding to the DRX for a UE in a connected state, the base station may configure a specific DRX for the UE by using a dedicated signaling according to service characteristics of the UE.

A new state is introduced in a New Radio (NR) system. The new state is different from the RRC idle state and the RRC connected state in the related LTE system. This new state is an inactive state. In the LTE system, Discontinuous reception (DRX) parameters may be configured for the UEs in the RRC idle state and in the RRC connected state, respectively, thereby achieving a purpose of saving power consumption of the UEs.

However, for the UE in the inactive state, although a UE-specific DRX (UE specific RAN DRX) parameter at a network side, i.e., an inactive-state DRX parameter, is introduced in the NR system, a specific configuration method for the parameter is not provided, causing the UE in the inactive state to be incapable of performing discontinuous reception according to the inactive-state DRX parameter.

SUMMARY

The present disclosure provides a method of configuring a discontinuous reception (DRX) parameter, a terminal and a network side device.

In a first aspect, the present disclosure provides a method of configuring a discontinuous reception (DRX) parameter, applied to a terminal. The method includes receiving a message transmitted by a network side device; and acquiring, from the message, an inactive-state DRX parameter configured by the network side device for the terminal.

In a second aspect, the present disclosure provides a method of configuring a discontinuous reception (DRX) parameter, applied to a network side device. The method includes: configuring an inactive-state DRX parameter for a terminal; and transmitting a message including the inactive-state DRX parameter to the terminal.

In a third aspect, the present disclosure further provides a terminal. The terminal includes: a receiving module, configured to receive a message transmitted by a network side device; and a parameter acquiring module, configured to acquire, from the message, an inactive-state DRX parameter configured by the network side device for the terminal.

In a fourth aspect, the present disclosure further provides a terminal. The terminal includes a storage and a processor, wherein a computer program executable by the processor is stored in the storage, and in a case that the computer program is executed by the processor, the processor implements steps of the above method of configuring a discontinuous reception (DRX) parameter applied to the terminal.

In a fifth aspect, the present disclosure further provides a non-transitory computer readable storage medium. The non-transitory computer readable storage medium includes: a computer program stored on the computer readable storage medium, wherein in a case that the computer program is executed by a processor, the processor implements steps of the above method of configuring a discontinuous reception (DRX) parameter applied to the terminal.

In a sixth aspect, the present disclosure further provides a network side device. The network side device includes: a configuration module, configured to configure an inactive-state DRX parameter for a terminal; and a transmitting module, configured to transmit a message including the inactive-state DRX parameter to the terminal.

In a seventh aspect, the present disclosure further provides a network side device. The network side device includes a storage and a processor, wherein a computer program executable on the processor is stored in the storage; in a case that the computer program is executed by the processor, the processor implements steps of the method of configuring a discontinuous reception DRX parameter applied to the network side device.

In an eighth aspect, the present disclosure further provides a non-transitory computer readable storage medium. The non-transitory computer readable storage medium includes a computer program stored on the computer readable storage medium, wherein in a case that the computer program is executed by the processor, the processor implements steps of the method of configuring a discontinuous reception DRX parameter applied to the network side device.

BRIEF DESCRIPTION OF THE DRAWINGS

In order to illustrate technical solutions of the present disclosure more clearly, the drawings to be used in description of the present disclosure will be briefly described below. Obviously, the drawings in the following description are only some of the embodiments of the present disclosure, and those skilled in the art may acquire other drawings according to the drawings without paying any inventive effort.

DETAILED DESCRIPTION

In order to make technical problems, technical solutions, and advantages of the present disclosure clearer, the following detailed description will be made with reference to the accompanying drawings and specific embodiments. In the following description, specific details, such as specific configurations and components, are merely provided to assist in a comprehensive understanding of the present disclosure. Therefore, it will be apparent to those skilled in the art that various changes and modifications may be made to the embodiments described herein without departing from the scope and spirit of the present disclosure. In addition, descriptions of well-known functions and constructions are omitted for clarity and conciseness.

It is to be understood that such a phrase as "one embodiment" or "an embodiment" as used throughout the specification means that a particular feature, structure, or characteristic relating to the embodiment is included in at least one embodiment of the present disclosure. Thus, "in one embodiment" or "in an embodiment", used throughout the specification, does not necessarily mean the same embodiment. In addition, the particular feature, structure, or characteristic may be combined in any suitable manner in one or more embodiments.

In various embodiments of the present disclosure, it should be understood that values of serial numbers of the following processes do not imply a sequence of executing the processes, and an order of executing the processes should be determined by functions and internal logics thereof, and should constitute any limitation to an implementation process of the present disclosure.

A method of configuring a discontinuous reception (DRX) parameter, a terminal and a network side device provided by the present disclosure may configure an inactive-state DRX parameter for a terminal in an inactive state.

Figure 1:
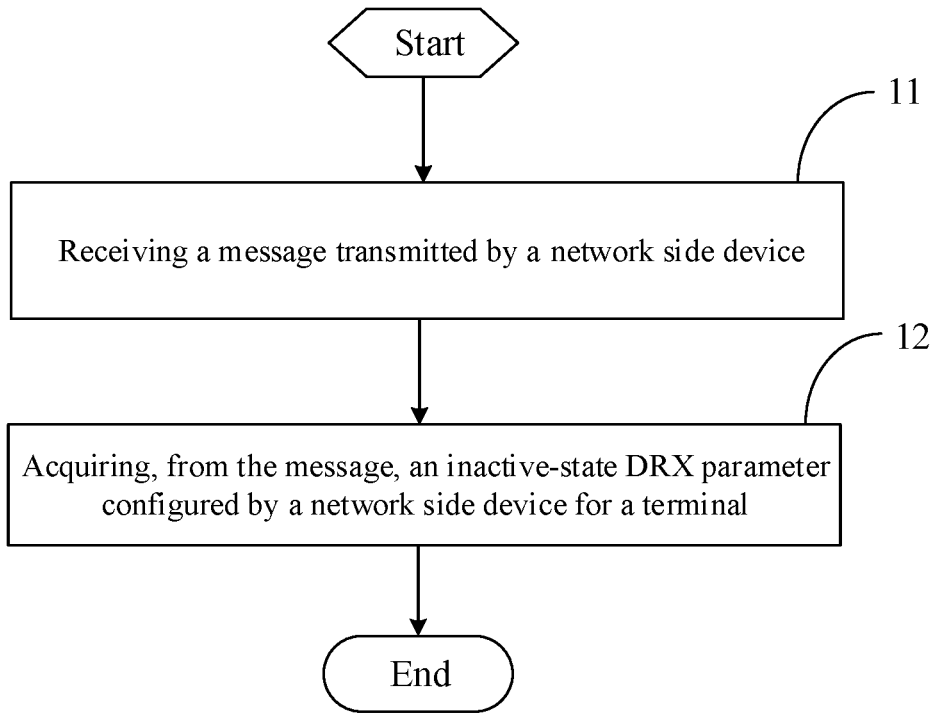
FIG. 1 is a schematic flowchart illustrating a method of configuring a DRX parameter provided by the present disclosure.

As shown in FIG. 1, the present disclosure provides a method of configuring a Discontinuous Reception (DRX) parameter. The method of configuring the DRX parameter is applied to a terminal and includes steps 11-12.

Step 11: receiving a message transmitted by a network side device.

Here, the terminal may specifically be a smart phone (or a mobile phone) or another device capable of transmitting or receiving a wireless signal, such as a User Equipment (UE), a Personal Digital Assistant (PDA), a wireless modem, a wireless communication device, a handheld device, a laptop, a cordless phone, a Wireless Local Loop (WLL) station, a Customer Premise Equipment (CPE) or a mobile smart hotspot capable of converting a mobile signal into a Wi-Fi signal, a smart home appliance, other devices capable of communicating spontaneously with a mobile communication network without human intervention, or the like. The above-mentioned inactive-state DRX parameter may be transmitted by a device node at a network side, and the device node may be a base station. In the present disclosure, a form of the base station is not limited, and may be a Macro Base Station or a Pico Base Station, a Node B (a name of a 3G mobile base station), an enhanced base station (eNB), a home enhanced base station (a Femto eNB, a home eNode B, a home eNB or a HeNB), a relay station, an access point, a Remote Radio Unit (RRU), a Remote Radio Head (RRH), a gNB (a name of a fifth-generation (5G) mobile base station), and a node at the network side in the 5G mobile communication system, such as a Central Unit (CU) and a Distributed Unit (DU), and so on.

An inactive-state DRX parameter may be carried in a message transmitted by the network side device, wherein the inactive-state DRX parameter is a DRX parameter for a terminal in the inactive state. The inactive-state DRX parameter may specifically include a DRX cycle, a DRX validity duration (such as effective time and expiration time) and the like, which are not specifically limited in the present disclosure. Any DRX parameter used in the inactive state may be included in the above-mentioned inactive-state DRX parameter.

Specifically, in a case that the terminal is in the inactive state, the terminal may receive a fourth message (such as a MSG4) transmitted by the network side device in an update process for a Radio Access Network (RAN) notification area, wherein the inactive-state DRX parameter is carried in the fourth message; or, in a case that the terminal is in the inactive state, the terminal may receive the fourth message (such as the MSG4) transmitted by the network side device in a random access procedure, wherein the inactive-state DRX parameter is carried in the fourth message; or, in a case that the terminal is in the inactive state, the terminal receives a RAN paging message transmitted by the network side device, wherein the inactive-state DRX parameter is carried in the RAN paging message; or, in a case that the terminal is in the radio resource control (RRC) connected state, the terminal receives a handover command transmitted by the network side device, wherein the inactive-state DRX parameter is carried in the handover command.

Step 12: acquiring from the message an inactive-state DRX parameter configured by the network side device for the terminal.

Here, the terminal may acquire the inactive-state DRX parameter from the message transmitted by the network. Further, the terminal may further maintain DRX parameter configuration of the terminal according to the inactive-state DRX parameter transmitted by the network side device. Specifically, the terminal may update the DRX parameter configuration of the terminal according to the inactive-state DRX parameter transmitted by the network side device. For example, in a case that an inactive-state-related DRX parameter is not stored locally in the DRX parameter configuration of the terminal, the inactive-state-related DRX parameter is added locally to the DRX parameter configuration based on the inactive-state DRX parameter. In a case that an inactive-state-related DRX parameter is already stored locally in the DRX parameter configuration of the terminal, the inactive-state-related DRX parameter stored locally in the DRX parameter configuration is updated according to the inactive-state DRX parameter.

Through the above steps, the terminal of the present disclosure may acquire, based on the message transmitted by the network side device, the inactive-state DRX parameter configured by the network side device for the terminal, so that the terminal in the inactive state may perform the discontinuous reception based on the received inactive-state DRX parameter, thereby achieving the purpose of saving power consumption of the terminal.

As an implementation, the network side device in the present disclosure may transmit the inactive-state DRX parameter by using the MSG4 in the random access procedure, and the terminal acquires the inactive-state DRX parameter by receiving the MSG4.

Figure 2:
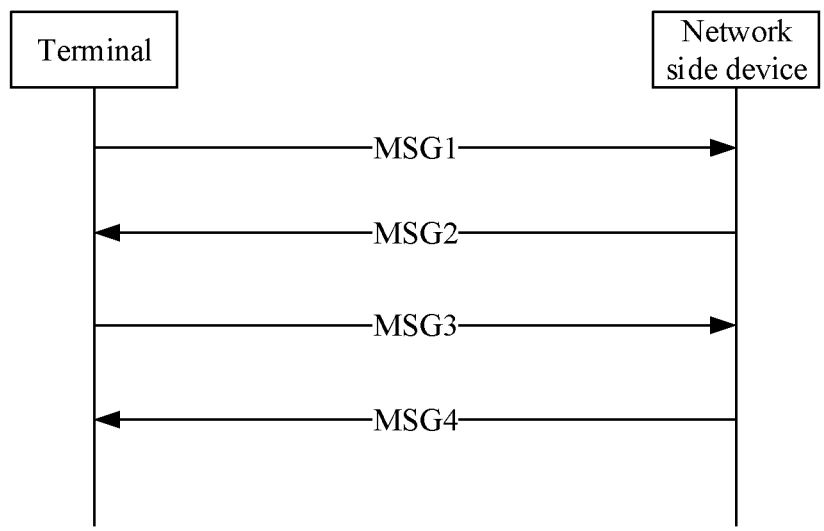
FIG. 2 is a schematic diagram illustrating message interaction in a random access procedure in the related art.

In the random access procedure, the terminal and the network side device usually communicate four interactive messages therebetween, as shown in FIG. 2, which are a first message MSG1 transmitted by the terminal to the network side device, a second message MSG2 transmitted by the network side device to the terminal, a third message MSG3 transmitted by the terminal to the network side device, and the fourth message MSG4 transmitted by the network side device to the terminal in sequence. Specifically, in the MSG1, the terminal may transmit a random access preamble to the network side device (the base station) through a Physical Random Access CHannel (PRACH), so as to cause the base station to complete processing such as uplink timing estimation, etc.; in the MSG2, the network side device (the base station) may transmit a Random Access Response (RAR) to the terminal through a Physical Downlink Shared CHannel PDSCH, and information, such as a timing advance command transmitted by the base station and a time-frequency resource used for transmitting the MSG3, etc., may carried in the response, so that the terminal may acquire the timing advance command transmitted by the base station and the time-frequency resource used for transmitting the MSG3; in the MSG3, the terminal transmits a layer 1/layer 2 (L1/L2) message to the network side device (the base station) through a Physical uplink Shared CHannel PUSCH, and the message may include a Radio Resource control (RRC) connection request, a tracking area update request, a scheduling request, and the like; in the MSG4, the network side device (the base station) transmits a contention resolution message to the terminal through the Physical Downlink Shared CHannel PDSCH.

A specific implementation of transmitting the inactive-state DRX parameter will be further described below with reference to the accompanying drawings.

Figure 3:
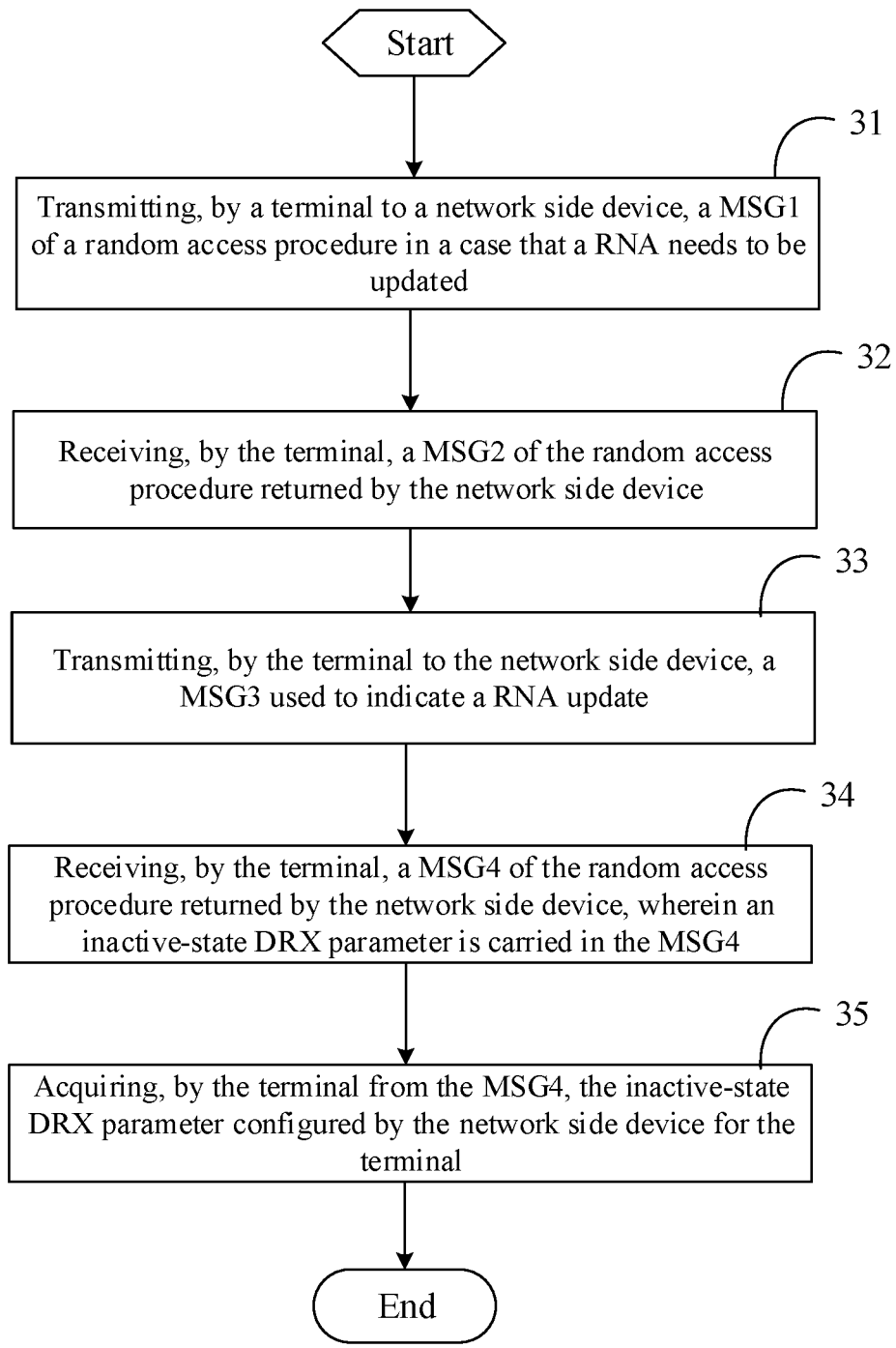
FIG. 3 is another schematic flowchart illustrating a method of configuring a DRX parameter provided by the present disclosure.

Referring to FIG. 3, the present disclosure also provides another example of a method of configuring a DRX parameter. The example is applied to a terminal, and the method implements configuration of an inactive-state DRX parameter in the random access procedure triggered by updating the radio access network notification area. As shown in FIG. 3, the method includes steps 31-35.

Step 31: transmitting, by the terminal to a network side device, a MSG1 of a random access procedure in a case that a radio access network notification area (RAN notification area (RNA)) needs to be updated.

Here, the terminal may periodically update the RNA according to a pre-configured update cycle. The terminal may also initiate the RNA update based on triggering by a specific event. The present disclosure does not specifically limit a condition for updating the RNA. In a case that the terminal initiates the RNA update, the terminal usually initiates the random access procedure and establishes a connection with the network side device. In the foregoing step 31, the terminal initiates the random access procedure by transmitting the MSG1.

Step 32: receiving, by the terminal, a MSG2 of the random access procedure returned by the network side device.

Step 33: transmitting, by the terminal to the network side device, a MSG3 used to indicate a RNA update.

Here, both of the MSG2 and the MSG3 are messages in the random access procedure, wherein the MSG2 may be a Random Access Response (RAR) message, and the MSG3 may be a tracking area update request message. As shown in FIG. 3, in the present disclosure, indication information configured to instruct the terminal to perform the RNA update may also be carried in the MSG3.

Step 34: receiving, by the terminal, a MSG4 of the random access procedure returned by the network side device, wherein an inactive-state DRX parameter is carried in the MSG4.

Optionally, configuration information for a Radio Access Network Notification Area may be carried in the MSG4.

Here, the network side device returns the MSG4 carrying the inactive-state DRX parameter to the terminal, and the MSG4 may be a contention resolution message, and configuration information for the RNA update, such as a cell list of the RNA and so on, may be further carried in the MSG4.

In addition, in the present disclosure, the MSG 4 may further carry state transition indication information for controlling a state transition of the terminal, such as a Radio Resource Control (RRC) suspending message or a Radio Resource control (RRC) resume message. In this way, the terminal may perform the state transition according to the state transition indication information in the MSG4. Specifically, the network side device may indicate, by using the MSG4 message, that the terminal is still in the inactive state or indicate, by using the MSG4 message, the terminal to transition into the RRC connected state. For example, in a case that the terminal in the inactive state receives the MSG4 carrying the RRC suspending message, the terminal keeps the inactive state. As another example, in a case that the terminal in the inactive state receives the MSG4 carrying the RRC resume message, the terminal is transitioned from the inactive state to the RRC connected state.

Step 35: acquiring, by the terminal from the MSG4, the inactive-state DRX parameter configured by the network side device for the terminal.

Here, the terminal may update the DRX parameter configuration of the terminal according to the inactive-state DRX parameter transmitted by the network side device. Specifically, in a case that an inactive-state-related DRX parameter is not stored locally in the DRX parameter configuration of the terminal, the inactive-stat-related DRX parameter is added locally to the DRX parameter configuration based on the inactive-state DRX parameter. In a case that an inactive-state-related DRX parameter is already stored locally in the DRX parameter configuration of the terminal, the inactive-state-related DRX parameter stored locally in the DRX parameter configuration of the terminal is updated based on the inactive-state DRX parameter.

Through the above steps, the present disclosure implements configuration of the inactive-state DRX parameter for the terminal in the inactive state during a RNA update procedure, so that the terminal in the inactive state may perform the Discontinuous reception according to the received inactive-state DRX parameter, thereby achieving the purpose of saving power consumption of the terminal.

Figure 4:
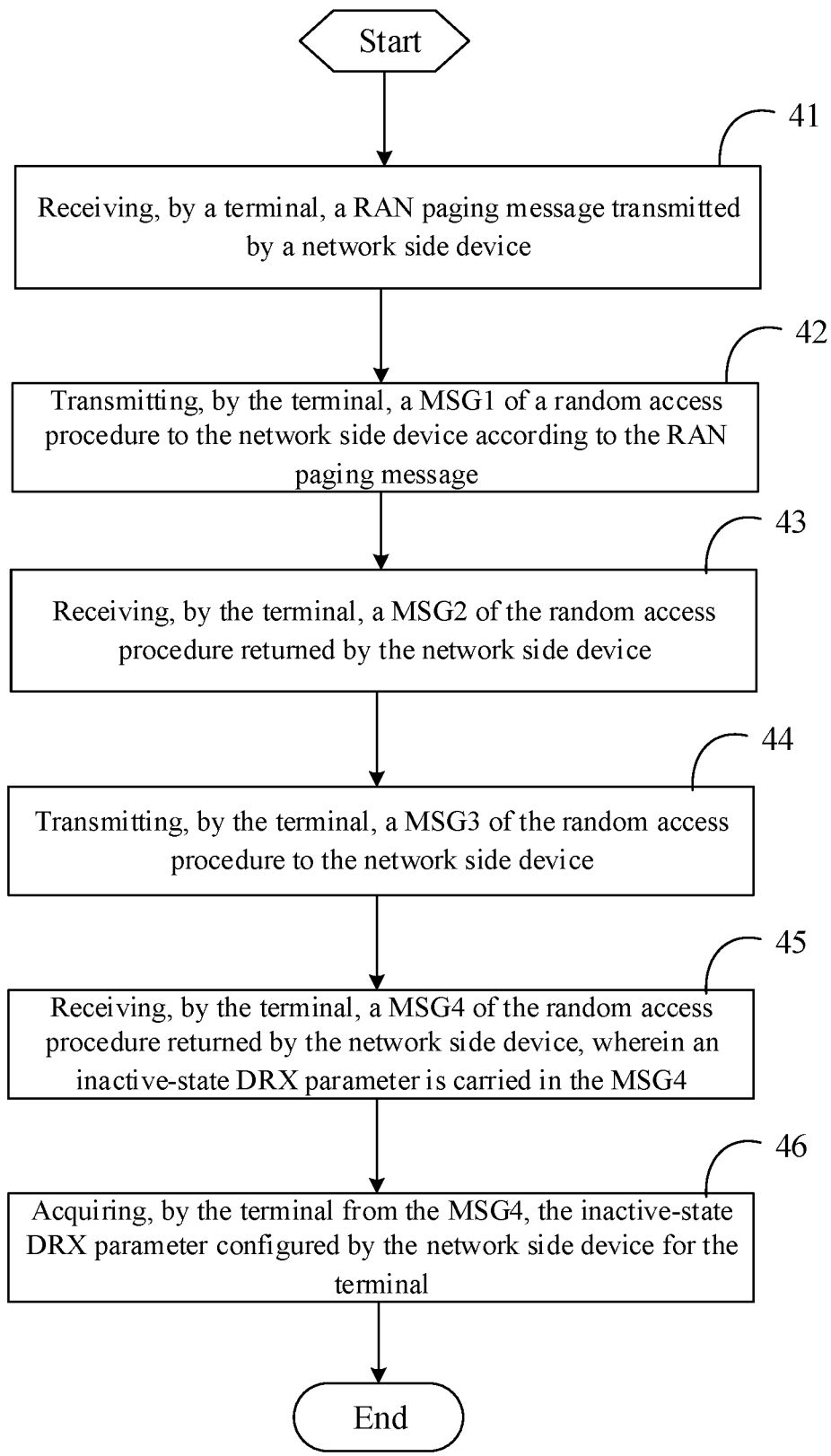
FIG. 4 is still another schematic flowchart illustrating a method of configuring a DRX parameter provided by the present disclosure.

Referring to FIG. 4, the present disclosure also provides another example of a method of configuring a DRX parameter. The example is applied to a terminal, and the method implements configuration of an inactive-state DRX parameter in a random access procedure triggered by paging. As shown in FIG. 4, the method includes steps 41-46.

Step 41: receiving, by the terminal, a RAN paging message transmitted by a network side device.

Here, in a case that service data of the terminal arrives, the network side device may initiate a paging procedure for the terminal and transmit a paging message to the terminal. The paging message may also be triggered by other conditions, which are not specifically limited in the present disclosure.

Step 42: transmitting, by the terminal, a MSG1 of a random access procedure to the network side device according to the RAN paging message.

Here, after the terminal receives the paging message, the terminal initiates a random access procedure and establishes a connection with the network. In the foregoing step 42, the terminal may initiate the random access procedure by transmitting the MSG1.

Step 43: receiving, by the terminal, a MSG2 of the random access procedure returned by the network side device.

Step 44: transmitting, by the terminal, a MSG3 of the random access procedure to the network side device.

Here, both of the foregoing MSG2 and the MSG3 are messages in the random access procedure, wherein the MSG2 may be a Random Access Response (RAR) message, and the MSG3 may be a RRC connection request message.

Step 45: receiving, by the terminal, a MSG4 of the random access procedure returned by the network side device, wherein an inactive-state DRX parameter is carried in the MSG4.

Here, the network side device returns to the terminal the MSG4 carrying the inactive-state DRX parameter. The MSG4 may be a contention resolution message, and configuration information of the RNA update, such as a cell list of the RNA, etc., may be further carried in the MSG4.

In addition, state transition indication information for controlling a state transition of the terminal, such as a Radio Resource control (RRC) suspending message or a Radio Resource control (RRC) resume message, may be further carried in the MSG4 in the present disclosure. In this way, the terminal may perform the state transition according to the state transition indication information in the MSG4. Specifically, the network side device may indicate, by using the MSG4 message, that the terminal is still in the inactive state or indicate, by using the MSG4 message, the terminal to transition into the RRC connected state. For example, in a case that the terminal in the inactive state receives the MSG4 carrying the RRC suspending message, the terminal keeps the inactive state. As another example, in a case that the terminal in the inactive state receives the MSG4 carrying the RRC resume message, the terminal will transition from the inactive state to the RRC connected state.

Step 46: acquiring, by the terminal from the MSG4, the inactive-state DRX parameter configured by the network side device for the terminal.

Here, the terminal may update DRX parameter configuration of the terminal according to the inactive-state DRX parameter transmitted by the network side device. Specifically, in a case that an inactive-state-related DRX parameter is not stored locally in the DRX parameter configuration of the terminal, the inactive-state-related DRX parameter is added locally to the DRX parameter configuration according to the inactive-state DRX parameter. In a case that an inactive-state-related DRX parameter is already stored locally in the DRX parameter configuration of the terminal, the inactive-state-related DRX parameter stored locally in the DRX parameter configuration is updated according to the inactive-state DRX parameter.

Through the above steps, the present disclosure implements configuration of the inactive-state DRX parameter for the terminal in the inactive state during the paging procedure, so that the terminal in the inactive state may perform Discontinuous reception according to the received inactive-state DRX parameter, thereby achieving the purpose of saving power consumption of the terminal.

Figure 5:
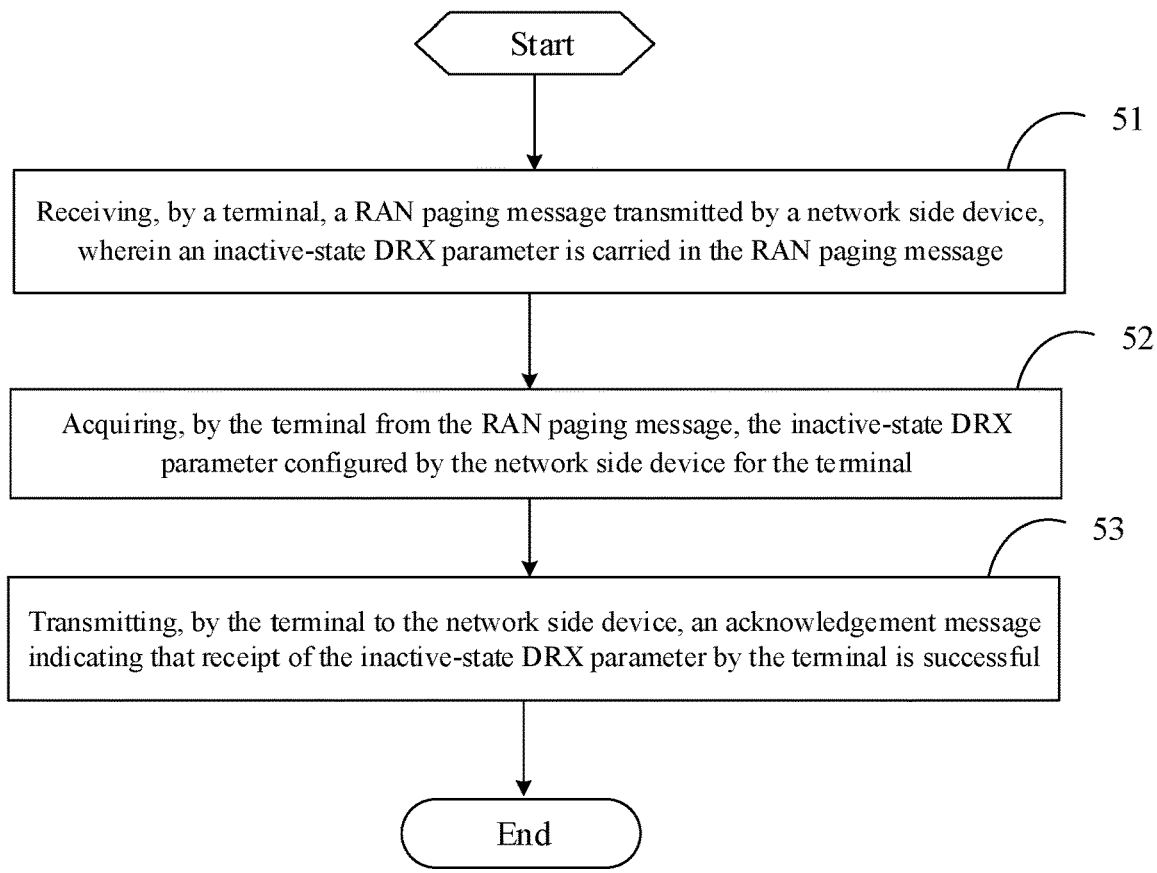
FIG. 5 is still yet another schematic flowchart illustrating a method of configuring a DRX parameter provided by the present disclosure.

Referring to FIG. 5, the present disclosure also provides another example of a method of configuring a DRX parameter. The example is applied to a terminal, and the method implements configuration of an inactive-state DRX parameter during a procedure triggered by a paging. As shown in FIG. 5, the method includes steps 51-53.

Step 51: receiving, by a terminal, a RAN paging message transmitted by a network side device, wherein an inactive-state DRX parameter is carried in the RAN paging message.

Here, in a case that service data of the terminal arrives, the network side device may initiate a paging procedure for the terminal and transmit a paging (RAN paging) message to the terminal. The paging message may also be triggered by other conditions, which are not specifically limited in the present disclosure. In the present disclosure, the network side device carries the inactive-state DRX parameter configured for the terminal in the transmitted paging message. Further, the RAN paging message may further carry information indicative of a transmission resource for transmitting the MSG1, wherein the transmission resource may specifically include: a preamble of a Physical Random Access CHannel (PRACH) and/or a time-frequency resource of the PRACH.

Step 52: acquiring, by the terminal from the RAN paging message, the inactive-state DRX parameter configured by the network side device for the terminal.

Here, the terminal may update DRX parameter configuration of the terminal according to the inactive-state DRX parameter transmitted by the network side device. Specifically, in a case that an inactive-state-related DRX parameter is not stored locally in the DRX parameter configuration of the terminal, the inactive-state-related DRX parameter is added locally in the DRX parameter configuration based on the inactive-state DRX parameter. In a case that an inactive-state-related DRX parameter is stored locally in the DRX parameter configuration of the terminal, the inactive-state-related DRX parameter stored locally in the DRX parameter configuration is updated according to the inactive-state DRX parameter.

Step 53: transmitting, by the terminal to the network side device, an acknowledgement message indicating that receipt of the inactive-state DRX parameter by the terminal is successful.

Here, it may indicated in the present disclosure in an explicit manner that receipt of the inactive-state DRX parameter by the terminal is successful, for example, a corresponding acknowledgment field is carried in the acknowledgment message to indicate that the inactive-state DRX parameter has been received. It may also be confirmed in an implicit manner in the present disclosure, for example, by transmitting a first message to the network side device, and by indicating, using the first message to the network side device, that receipt of the inactive-state DRX parameter by the terminal is successful. If the first message is transmitted by using a predetermined PRACH resource, it may be indicated that receipt of the inactive-state DRX parameter by the terminal is successful.

Here, the terminal may acquire the inactive-state DRX parameter from the RAN paging message. Subsequently, the terminal in the present disclosure may further initiate a random access procedure in response to the paging message, and the terminal may further returns an acknowledgement message to the network side device, the acknowledgement message indicates that receipt of the inactive-state DRX parameter by the terminal is successful. Specifically, the terminal may transmit, by using the MSG1 of the random access procedure, the acknowledgement information indicating that the inactive-state DRX parameter has been received. The acknowledgment information may be indicated in an implicit manner, for example, the first message is transmitted to the network side device by using a Physical Random Access CHannel (PRACH) resource indicated by the RAN paging message; or the first message MSG1 may be transmitted to the network side device by using a PRACH resource indicated by a broadcast of the network side device; or the first message is transmitted to the network side device by using a reserved PRACH resource. In this way, after the network side device receives the first message on the foregoing resource, it may be determined that receipt of the inactive-state DRX parameter by the terminal is successful. Here, the PRACH resource may specifically include: a PRACH preamble and/or a PRACH time-frequency resource. The first message is transmitted over the specific resource to implicitly indicate that receipt of the inactive-state DRX parameter by the terminal is successful.

Through the above steps, the present disclosure implements configuration of the inactive-state DRX parameter for the terminal in the inactive state during the paging procedure, so that the terminal in the inactive state may perform the discontinuous reception according to the received inactive-state DRX parameter, thereby achieving the purpose of saving power consumption of the terminal.

The above embodiments describe how the terminal in the inactive state maintains the inactive-state DRX parameter. The present disclosure describes an implementation of maintaining an inactive-state DRX parameter for a terminal in the connected state hereinafter.

Figure 6:
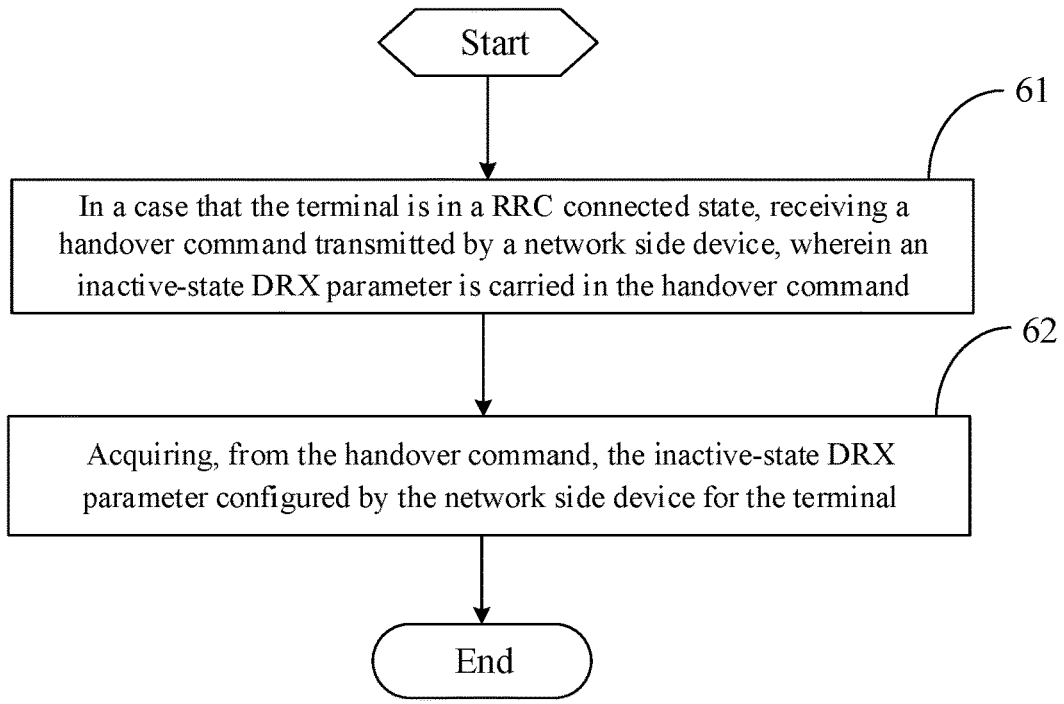
FIG. 6 is still yet another schematic flowchart illustrating a method of configuring a DRX parameter provided by the present disclosure.

Referring to FIG. 6, the present disclosure also provides another example of a method of configuring a DRX parameter. The example is applied in a terminal and includes steps 61-62.

Step 61: in a case that the terminal is in a RRC connected state, receiving a handover command transmitted by a network side device, wherein an inactive-state DRX parameter is carried in the handover command.

Here, in a case that the terminal performs a cell handover, it may be necessary to configure or reconfigure the inactive-state DRX parameters used by the terminal in the inactive state. For example, the inactive-state DRX parameter may be configured/reconfigured in a handover command for the terminal.

Step 62: acquiring, from the handover command, the inactive-state DRX parameter configured by the network side device for the terminal.

Here, the terminal may update DRX parameter configuration of the terminal according to the inactive-state DRX parameter transmitted by the network side device. Specifically, in a case that an inactive-state-related DRX parameter is not stored locally in the DRX parameter configuration of the terminal, the inactive-state-related DRX parameter is added locally to the DRX parameter configuration based on the inactive-state DRX parameter. In a case that an inactive-state-related DRX parameter is already stored locally in the DRX parameter configuration of the terminal, the inactive-state-related DRX parameter stored locally in the DRX parameter configuration is updated according to the inactive-state DRX parameter.

Through the above steps, the present disclosure implements configuration of the inactive-state DRX parameter for the terminal in the connected state during a handover procedure, so that when the terminal enters the inactive state, the terminal may perform the discontinuous reception based on the received inactive-state DRX parameter, thereby achieving the purpose of saving power consumption of the terminal.

The present disclosure may also configure/reconfigure inactive-state DRX parameters for the terminal during processes of establishing/reconfiguring/re-establishing an RRC connection between the terminal and the target base station, for example, the inactive-state DRX parameter is carried in the RRCConnectionSetup or RRCConnectionReconfiguration or RRCConnectionReestablishment signaling. After the terminal receives the above signaling, the terminal maintains the DRX parameter configuration of the terminal according to the inactive-state DRX parameter carried in the signaling.

It should be noted that the above methods of configuring a DRX parameter provided by the present disclosure may be used by combination them, for example, the inactive-state DRX parameter is configured by using the method provided by one of the embodiments and the inactive-state DRX parameter is reconfigured (such as updating the inactive-state DRX parameter) by using the method provided by another one of the embodiments. The inactive-state DRX parameter may also be configured and reconfigured by using the method provided by the same embodiment.

Figure 7:
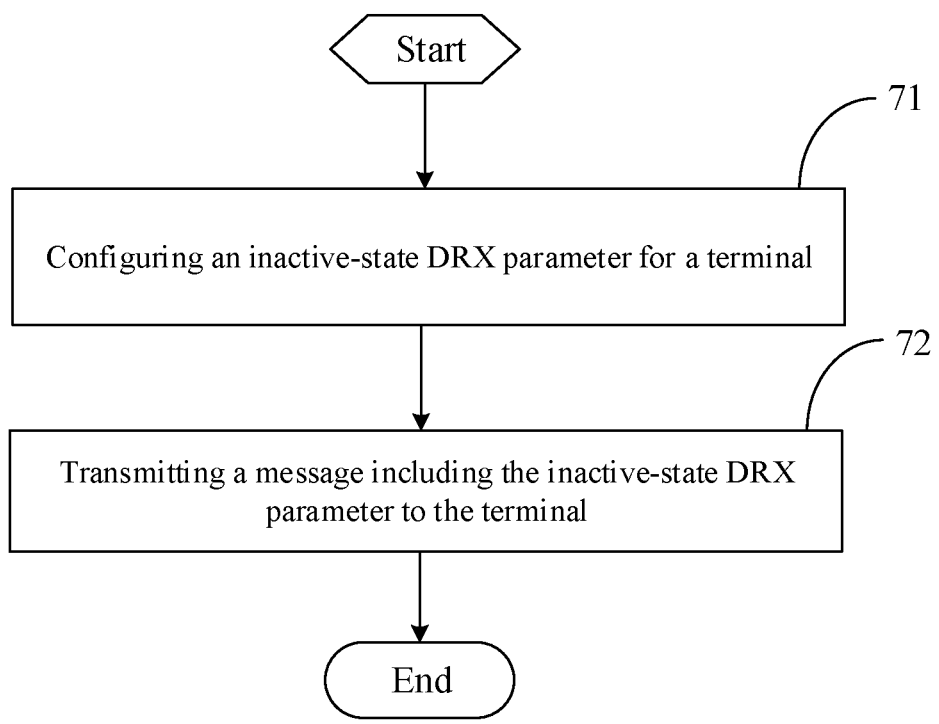
FIG. 7 is still yet another schematic flowchart illustrating a method of configuring a DRX parameter provided by the present disclosure.

Corresponding to the above, the present disclosure further provides a method of configuring a DRX parameter. The method is applied to a network side device, and the network side device may be a base station. As shown in FIG. 7, the method includes steps 71-72.

Step 71: configuring an inactive-state DRX parameter for a terminal.

Here, the foregoing inactive-state DRX parameter is a DRX parameter of the terminal in the inactive state, and the inactive-state DRX parameter may specifically include a DRX cycle, a DRX validity duration (such as effective time and expiration time) and the like, which are not specifically limited in the present disclosure. Any DRX parameter used in the inactive state may be included in the above-mentioned inactive-state DRX parameter. Here, the network side may configure the inactive-state DRX parameter for the terminal in the inactive state.

Step 72: transmitting a message including the inactive-state DRX parameter to the terminal.

Here, in a case that the terminal is in the inactive state, the fourth message is transmitted to the terminal in the process of updating the RAN notification area, wherein the inactive-state DRX parameter is carried in the fourth message; or, in a case that the terminal is in the inactive state, the fourth message is transmitted to the terminal in the random access procedure, wherein the inactive-state DRX parameter is carried in the fourth message; or, in a case that the terminal is in the inactive state, the RAN paging message is transmitted to the terminal, wherein the inactive-state DRX parameter is carried in the RAN paging message; or, in a case that the terminal is in a Radio Resource control (RRC) connected state, a handover command is transmitted to the terminal, wherein the inactive-state DRX parameter is carried in the handover command.

Through above steps, the network side device in the present disclosure may configure the inactive-state DRX parameter for the terminal, so that the terminal in the inactive state may perform discontinuous reception according to the received inactive-state DRX parameter, thereby achieving the purpose of saving power consumption of the terminal.

As an implementation, the network side device in the present disclosure may transmit the inactive-state DRX parameter by using the MSG4 of the random access procedure, and the terminal acquires the inactive-state DRX parameter by receiving the MSG4.

Figure 8:
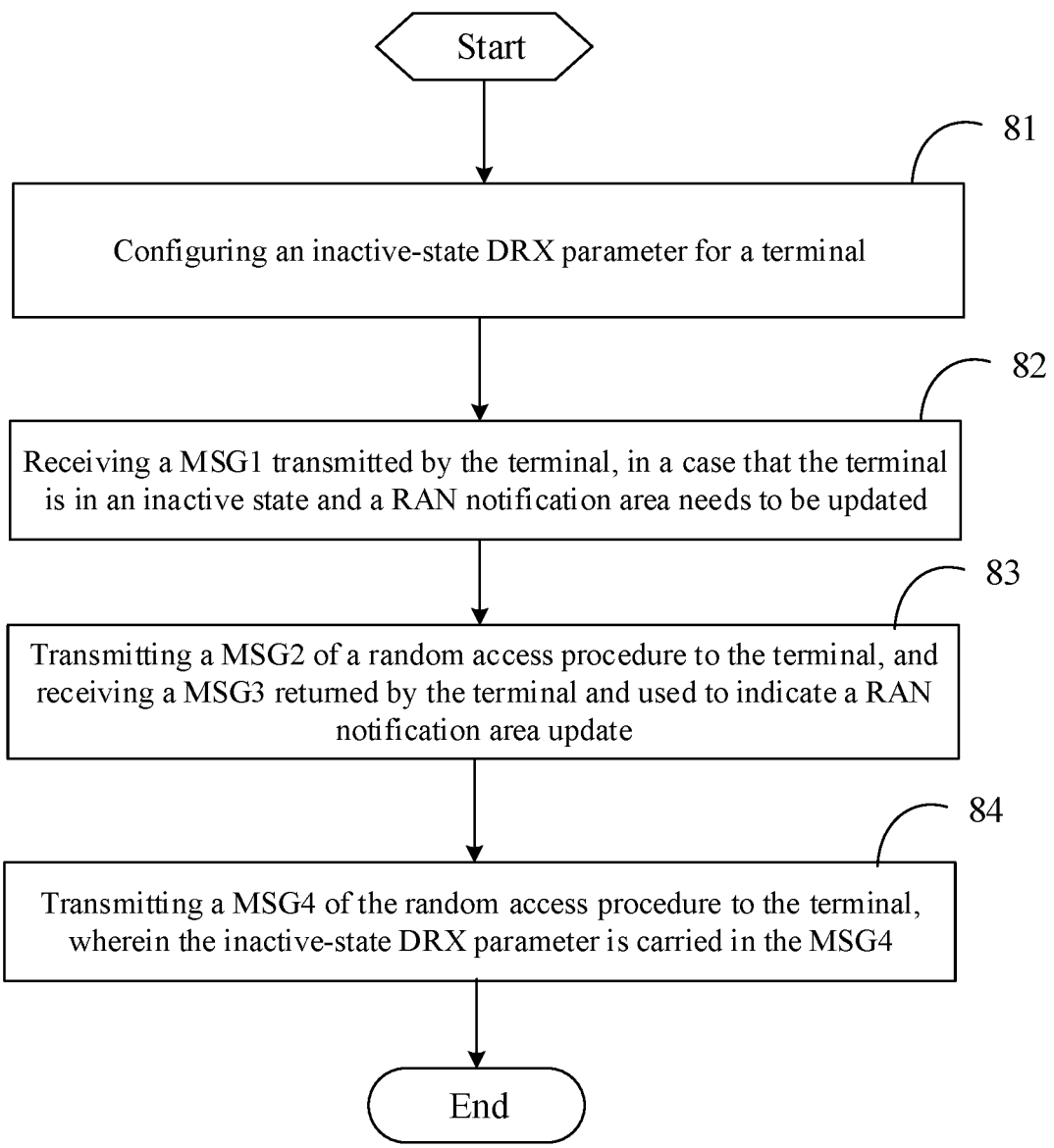
FIG. 8 is still yet another schematic flowchart illustrating a method of configuring a DRX parameter provided by the present disclosure.

As shown in FIG. 8, the present disclosure also provides another example of a method of configuring a DRX parameter. The example is applied to a network side device, and the network side device may be a base station, and the method includes steps 81-84

Step 81: configuring an inactive-state DRX parameter for a terminal.

Here, the foregoing inactive-state DRX parameter is a DRX parameter of the terminal in the inactive state, and the inactive-state DRX parameter may specifically include a DRX cycle, a DRX validity duration (such as effective time and expiration time) and the like, which are not specifically limited in the present disclosure. Any DRX parameter used in the inactive state may be included in the above-mentioned inactive-state DRX parameter.

Step 82: receiving a MSG1 transmitted by the terminal, in a case that the terminal is in the inactive state and a RAN notification area needs to be updated.

Step 83: transmitting a MSG2 of a random access procedure to the terminal, and receiving a MSG3 returned by the terminal and used to indicate the RAN notification area update.

Step 84: transmitting a MSG4 of the random access procedure to the terminal, wherein the inactive-state DRX parameter is carried in the MSG4.

The messages involved in the above steps may be obtained by referring to FIG. 3 and a description thereof in the foregoing, and will not be repeated herein.

Through the above steps, the present disclosure implements configuration of the inactive-state DRX parameter for the terminal in the inactive state during a RNA update procedure, so that the terminal in the inactive state may perform the discontinuous reception according to the received inactive-state DRX parameter, thereby achieving the purpose of saving power consumption of the terminal.

Figure 9:
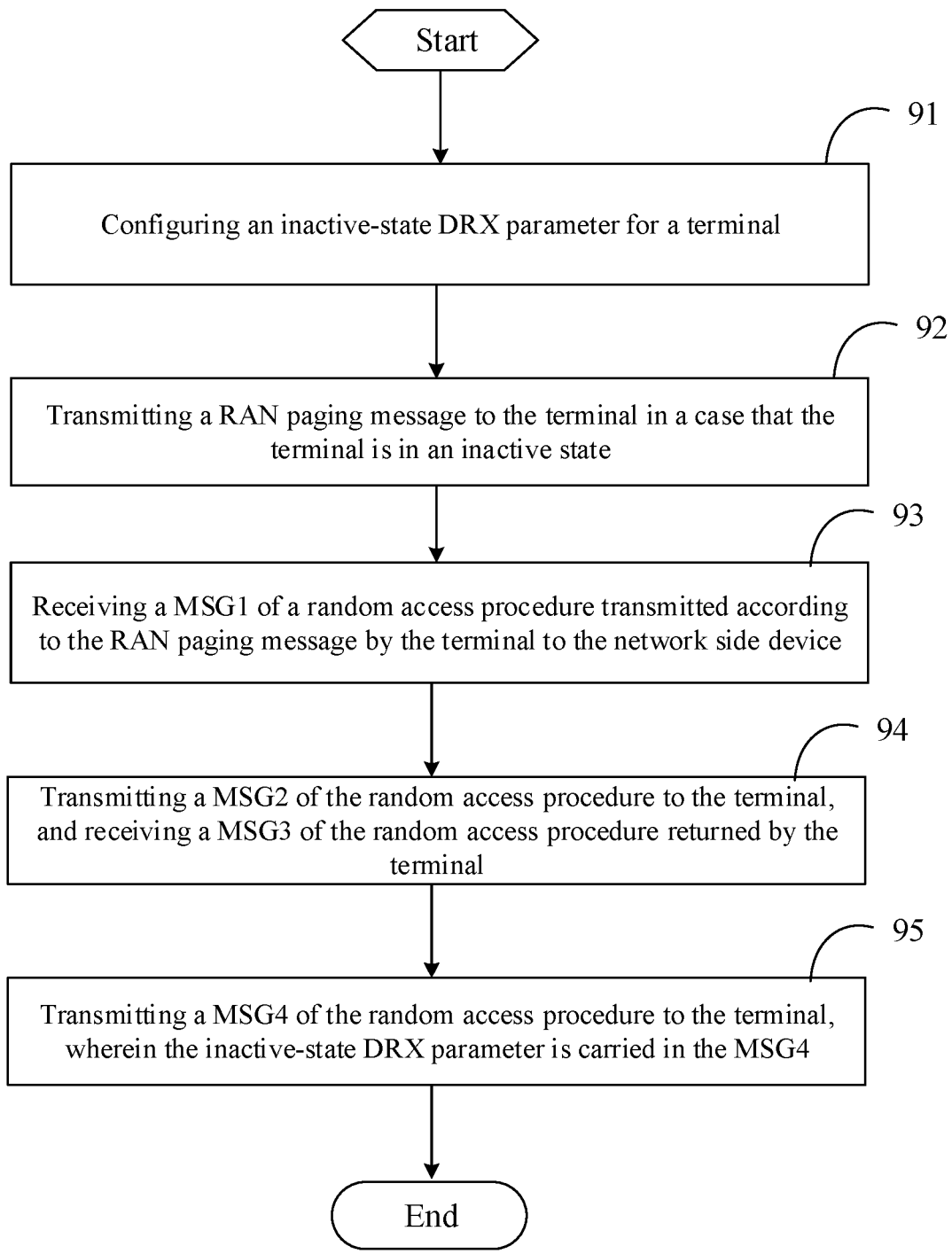
FIG. 9 is still yet another schematic flowchart illustrating a method of configuring a DRX parameter provided by the present disclosure.

As shown in FIG. 9, the present disclosure also provides another example of a method of configuring a DRX parameter. The example is applied to a network side device, the network side device may be a base station, and the method includes steps 91-95.

Step 91: configuring an inactive-state DRX parameter for a terminal.

Here, the foregoing inactive-state DRX parameter is a DRX parameter of the terminal in the inactive state. The inactive-state DRX parameter may specifically include a DRX cycle, a DRX validity duration (such as effective time and expiration time) and the like, which are not specifically limited in the present disclosure. Any DRX parameter used in the inactive state may be included in the above-mentioned inactive-state DRX parameter.

Step 92: transmitting a RAN paging message to the terminal in a case that the terminal is in the inactive state.

Here, in a case that the network side device needs to page the terminal, the RAN paging message is transmitted to the terminal by the network side device. In a case that service data of the terminal arrives, the network side device may initiate a process for paging the terminal and transmit a paging message to the terminal. The paging message may also be triggered by other conditions, which are not specifically limited in the present disclosure.

Step 93: receiving a MSG1 of a random access procedure transmitted according to the RAN paging message by the terminal to the network side device.

Step 94: transmitting a MSG2 of the random access procedure to the terminal, and receiving a MSG3 of the random access procedure returned by the terminal.

Step 95: transmitting a MSG4 of the random access procedure to the terminal, wherein the inactive-state DRX parameter is carried in the MSG4.

The messages involved in the above steps may be obtained by referring to FIG. 4 and a description thereof in the foregoing, and will not be repeated herein.

Through the above steps, the present disclosure implements configuration of the inactive-state DRX parameter for the terminal in the inactive state during a paging procedure, so that the terminal in the inactive state may perform the discontinuous reception according to the received inactive-state DRX parameter, thereby achieving the purpose of saving power consumption of the terminal.

Figure 10:
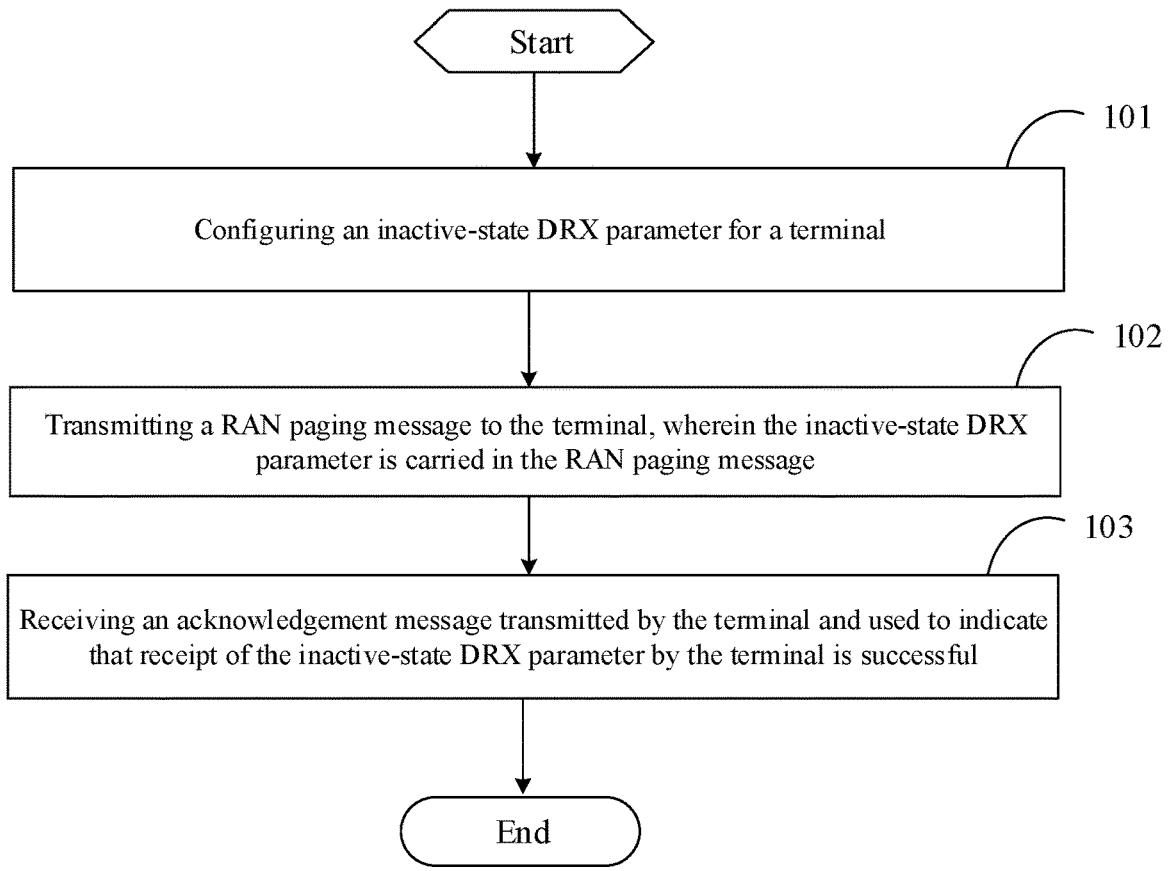
FIG. 10 is still yet another schematic flowchart illustrating a method of configuring a DRX parameter provided by the present disclosure.

As another implementation, the network in the present disclosure may transmit the inactive-state DRX parameter in the paging message during the paging procedure. As shown in FIG. 10, the present disclosure further provides another example of the method of configuring the DRX parameter. The example is applied to a network side device which may be a base station, and the method includes steps 101-103.

Step 101: configuring an inactive-state DRX parameter for a terminal.

Here, the foregoing inactive-state DRX parameter is a DRX parameter of the terminal in the inactive state, and the inactive-state DRX parameter may specifically include a DRX cycle, a DRX validity duration (such as effective time and expiration time) and the like, which are not specifically limited in the present disclosure. Any DRX parameter used in the inactive state may be included in the above-mentioned inactive-state DRX parameter.

Step 102: transmitting a RAN paging message to the terminal, wherein the inactive-state DRX parameter is carried in the RAN paging message.

Here, in a case that service data of the terminal arrives, the network side device may initiate a process for paging the terminal and transmit a paging message (a RAN paging message) to the terminal. The paging message may also be triggered by other conditions, which are not specifically limited in the present disclosure. In the present disclosure, the network side device carries the inactive-state DRX parameter configured for the terminal in the transmitted paging message. Further, the RAN paging message may further carry information of indicating a transmission resource for transmitting the MSG1, wherein the transmission resource may specifically include: a preamble of a Physical Random Access CHannel (PRACH) and/or a time-frequency resource for the PRACH.

Step 103: receiving an acknowledgement message transmitted by the terminal and used to indicate that receipt of the inactive-state DRX parameter by the terminal is successful.

Here, the network side device may receive an acknowledgement message returned by the terminal, so as to learn that the terminal has obtained the inactive-state DRX parameter. Specifically, the acknowledgement message may explicitly indicate that the inactive-state DRX parameter has been received, for example, a corresponding acknowledgement field is carried in the acknowledgement message to indicate that the inactive-state DRX parameter has been received. The acknowledgment message may also implicitly indicate that the inactive-state DRX parameter has been received, for example, the first message (MSG1) transmitted by the terminal is received, and the first message is used to indicate, to the network side device, that the inactive-state DRX parameter has been received by the terminal. Specifically, the first message is transmitted by using a predetermined PRACH resource, to indicate that receipt of the inactive-state DRX parameter by the terminal is successful. For example, the MSG1 of the random access procedure transmitted by the terminal by using a transmission resource indicated by the RAN paging message, may be received; or the MSG1 of the random access procedure transmitted by the terminal through a transmission resource indicated by a broadcast of the network side device, is received; or the MSG1 of the random access procedure transmitted by the terminal through a reserved transmission resource is received. Here, the PRACH resource includes a preamble of the PRACH and/or a time-frequency resource for the PRACH.

The messages involved in the above steps may be obtained by referring to FIG. 5 and a description thereof in the foregoing, and will not be repeated herein.

Through the above steps, the present disclosure implements configuration of the inactive-state DRX parameter for the terminal in the inactive state in a paging procedure, so that the terminal in the inactive state may perform the discontinuous reception according to the received inactive-state DRX parameter, thereby achieving the purpose of saving power consumption of the terminal.

The above embodiments describe how the network side device configures the inactive-state DRX parameter for a terminal in an inactive state. The present disclosure describes an implementation of configuring an inactive-state DRX parameter for a terminal in the connected state hereinafter.

Figure 11:
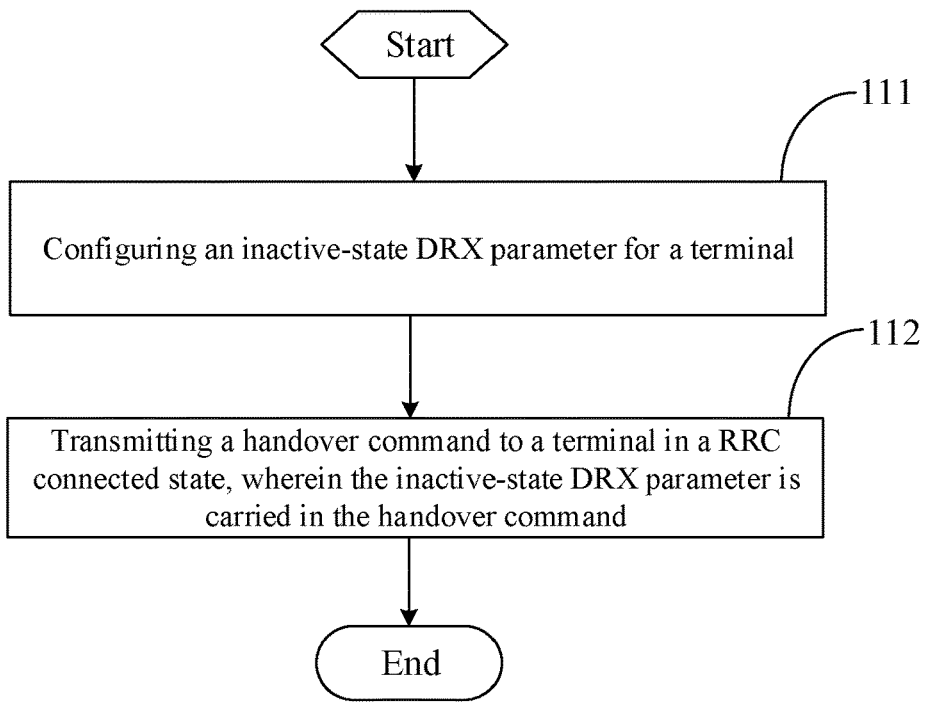
FIG. 11 is still yet another schematic flowchart illustrating a method of configuring a DRX parameter provided by the present disclosure.

As shown in FIG. 11, the present disclosure also provides another example of a method of configuring a DRX parameter. The example is applied to a network side device, and the network side device may be a base station, and the method includes steps 111-112.

Step 111: configuring an inactive-state DRX parameter for a terminal.

Here, the foregoing inactive-state DRX parameter is a DRX parameter of the terminal in the inactive state, and the inactive-state DRX parameter may specifically include a DRX cycle, a DRX validity duration (such as effective time and expiration time) and the like, which are not specifically limited in the present disclosure. Any DRX parameter used in the inactive state may be included in the above-mentioned inactive-state DRX parameter. Here, the network side may configure the inactive-state DRX parameter for the terminal in a RRC connected state.

Step 112: transmitting a handover command to a terminal in a RRC connected state, wherein the inactive-state DRX parameter is carried in the handover command.

Here, in a case that the terminal performs a cell handover procedure, the inactive-state DRX parameter used by the terminal in the inactive state possibly needs to be configured or reconfigured. At this time, the network side device may enable the inactive-state DRX parameter to be carried in the handover command, thereby configuring/reconfiguring the inactive-state DRX parameter for the terminal.

Through the above steps, the present disclosure implements configuration of the inactive-state DRX parameter for the terminal in the connected state during a handover procedure, therefore, in a case that the terminal enters the inactive state, discontinuous reception may be performed by the terminal according to the received inactive-state DRX parameter, thereby achieving the purpose of saving power consumption of the terminal.

The present disclosure may also configure/reconfigure inactive-state DRX parameters for the terminal during processes of establishing/reconfiguring/re-establishing an RRC connection between the terminal and the target base station. For example, the inactive-state DRX parameter is carried in the RRCConnectionSetup signaling or the RRCConnectionReconfiguration signaling or the RRCConnectionReestablishment signaling. After the terminal receives the above signaling, the terminal maintains the DRX parameter configuration of the terminal according to the inactive-state DRX parameter carried in the signaling.

It should be noted that the above methods of configuring a DRX parameter provided by the present disclosure may be used by combination them, for example, the inactive-state DRX parameter is configured by using the method provided by one of the embodiments and the inactive-state DRX parameter is reconfigured (such as updating the inactive-state DRX parameter) by using the method provided by another one of the embodiments. The inactive-state DRX parameter may also be configured and reconfigured by using the method provided by the same embodiment.

Based on the above methods, the present disclosure also provides a device of implementing the above methods.

Figure 12:
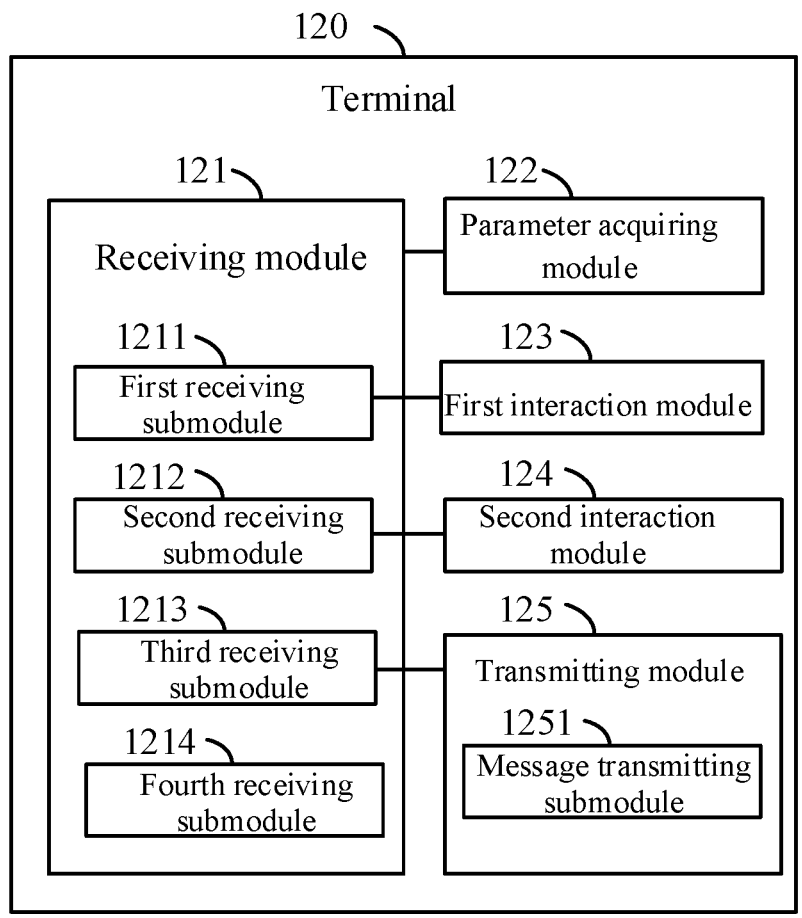
FIG. 12 is a schematic structural diagram illustrating a terminal provided by the present disclosure.

Referring to FIG. 12, the present disclosure provides a terminal 120, and the terminal 120 includes a receiving module 121 and a parameter acquiring module 122.

The receiving module 121 is configured to receive a message transmitted by a network side device in a case that the terminal is in an inactive state.

The parameter acquiring module 122 is configured to acquire, from the message, an inactive-state DRX parameter configured by the network side device for the terminal.

As shown in FIG. 12, the receiving module 121 may include a first receiving submodule 1211, or a second receiving submodule 1212, or a third receiving submodule 1213, or a fourth receiving submodule 1214. The first receiving submodule 1211 is configured to receive a fourth message transmitted by the network side device in a process of updating a RAN notification area in a case that the terminal is in the inactive state, wherein the inactive-state DRX parameter is carried in the fourth message. The second receiving submodule 1212 is configured to receive the fourth message transmitted by the network side device in a random access procedure in a case that the terminal is in the inactive state, wherein the inactive-state DRX parameter is carried in the fourth message. The third receiving submodule 1213 is configured to receive a RAN paging message transmitted by the network side device in a case that the terminal is in the inactive state, wherein the inactive-state DRX parameter is carried in the RAN paging message. The fourth receiving submodule 1214 is configured to receive a handover command transmitted by the network side device in a case that the terminal is in a RRC connected state, wherein the inactive-state DRX parameter is carried in the handover command.

Optionally, the terminal 120 further includes a first interaction module 123. The first interaction module 123 is configured to: prior to receiving, by the a first receiving submodule, the fourth message and in a case that the terminal is in the inactive state and the RAN notification area needs to be updated, transmit a first message to the network side device, receive a second message returned by the network side device, and transmit, to the network side device, a third message used to indicate that the RAN notification area needs to be updated.

Here, configuration information about the RAN notification area is further carried in the fourth message received by the first receiving submodule.

Optionally, the terminal further includes a second interaction module 124. The second interaction module 124 is configured to: prior to receiving, by the second receiving submodule, the fourth message and in a case that the terminal is in the inactive state, receive a RAN paging message transmitted by the network side device, transmit a first message to the network side device, receive a second message returned by the network side device, and transmit a third message to the network side device.

Optionally, the terminal further includes a transmitting module 125. The transmitting module 125 is configured to: after the third receiving submodule receives the RAN paging message transmitted by the network side device, transmit to the network side device an acknowledgement message for indicating that receipt of the inactive-state DRX parameter by the terminal is successful.

Optionally, the transmitting module 125 may include a message transmitting submodule 1251. The message transmitting submodule 1251 is configured to transmit to the network side device a first message, the first message indicating to the network side device that receipt of the inactive-state DRX parameter by the terminal is successful.

Here, the message transmitting submodule 1251 is specifically configured to: transmit the first message to the network side device through a Physical Random Access CHannel (PRACH) resource indicated by the RAN paging message; or transmit the first message to the network side device through a PRACH resource indicated by a broadcast of the network side device; or transmit the first message to the network side device through a reserved PRACH resource.

Here, the PRACH resource includes: a preamble of a PRACH and/or a time-frequency resource of the PRACH.

It should be noted that the embodiment of the terminal is a terminal corresponding to the foregoing method of configuring the DRX parameter applied to the terminal side, and all implementations of the foregoing embodiments are applicable to the terminal embodiment, and the same technical effect may be achieved.

The present disclosure also provides a terminal. The terminal including a storage and a processor, wherein the storage includes a computer program stored on the storage and is executable by the processor; in a case that the computer program is executed by the processor, the processor implements the foregoing various steps in the embodiments of the method of configuring the DRX parameter at the terminal side, and may achieve the same technical effect, and will not be described herein to avoid repetition.

The present disclosure also provides a computer readable storage medium, wherein the computer readable storage medium stores a computer program thereon; in a case that the computer program is executed by a processor, the processor implements the foregoing various steps in the embodiments of the method of configuring the DRX parameter at the terminal side, and may achieve the same technical effect, and will not be described herein to avoid repetition. The computer readable storage medium may be volatile or non-volatile, such as a Read-Only Memory (ROM), a Random Access Memory (RAM), a disk, or a CD, etc.

Figure 13:
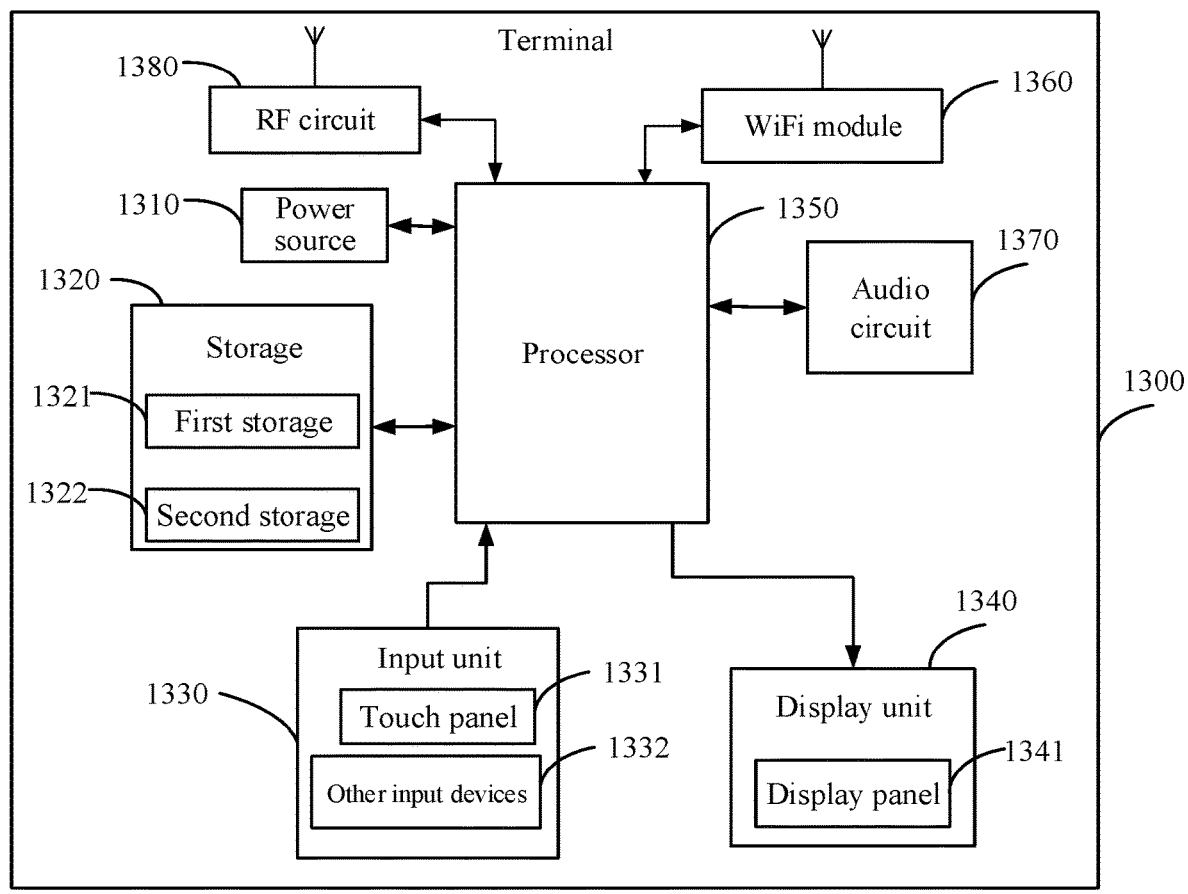
FIG. 13 is another schematic structural diagram illustrating a terminal provided by the present disclosure.

FIG. 13 is a schematic structural diagram illustrating a terminal of the present disclosure. Specifically, the terminal 1300 in FIG. 13 may be a mobile phone, a tablet computer, a Personal Digital Assistant (PDA), or an on-vehicle computer, etc.

The terminal 1300 in FIG. 13 includes a power source 1310, a storage 1320, an input unit 1330, a display unit 1340, a processor 1350, a Wireless Fidelity (WIFI) module 1360, an audio circuit 1370, and an RF circuit 1380.

The input unit 1330 may be configured to receive information inputted by a user and generate a signal input related to user's settings and function control of the terminal device 1300. Specifically, in the present disclosure, the input unit 1330 may include a touch panel 1331. The touch panel 1331, also referred to as a touch screen, may collect a user's touch operation thereon or nearby (such as an operation of the user on the touch panel 1331 using any suitable object or accessory such as a finger or a stylus), and drives a corresponding connected device according to a preset program. Optionally, the touch panel 1331 may include two parts, a touch detection device and a touch controller. The touch detection device detects a touch orientation of the user, and detects a signal generated by the touch operation, and transmits the signal to the touch controller; the touch controller receives touch information from the touch detection device, converts the touch information into a coordinate of a touch point, transmits the coordinate to the processor 1350, and may receive and execute a command transmitted from the processor 1350. In addition, the touch panel 1331 may be implemented in various types such as a resistive touch panel, a capacitive touch panel, an infrared touch panel, and a surface-acoustic-wave type touch panel, etc. In addition to the touch panel 1331, the input unit 1330 may further include other input devices 1332. The other input devices 1332 may include, but are not limited to, one or more of a physical keyboard, function buttons (such as a volume control button, a switch button, etc.), a trackball, a mouse, a joystick, and the like.

The display unit 1340 may be used to display information inputted by the user or information provided to the user as well as various menu interfaces of the terminal device. The display unit 1340 may include a display panel 1341. Optionally, the display panel 1341 may be configured in a form of an LCD, an Organic Light-Emitting Diode (OLED) or the like.

It should be noted that the touch panel 1331 may cover the display panel 1341 to form a touch display screen, and in a case that the touch display screen detects a touch operation thereon or nearby, the touch operation is transmitted to the processor 1350 to determine a type of a touch event, then the processor 1350 provides a corresponding visual output on the touch display based on the type of the touch event.

The touch display includes an application-program interface display area and a common control display area. An arrangement of the application-program interface display area and the common control display area are not limited, may be an arrangement in which two display areas may be distinguished, such as an up-down arrangement, a left-right arrangement, and the like. The application-program interface display area may be used to display an interface of an application program. Each interface may include interface elements such as at least one application icon and/or a widget desktop control. The application-program interface display area may also be a blank interface that does not include any content. The common control display area is used to display controls with a high usage rate, such as a setting button, an interface number, a scroll bar, a phone book icon, and the like.

The processor 1350 is a control center of the terminal device, connects various portions of the handset by using various interfaces and lines, and performs, by running or executing software programs and/or modules stored in a first storage 1321 and calling data stored in a second storage 1322, various functions of the terminal device and processes data to perform overall monitoring of the terminal device. Optionally, the processor 1350 may include one or more processing units.

In the present disclosure, by calling a software program and/or a module stored in the first storage 1321 and/or data in the second storage 1322, the processor 1350 is configured to: receive a message transmitted by a network side device; and acquire, from the message, the inactive-state DRX parameter configured by the network side device for the terminal.

Specifically, by calling a software program and/or a module stored in the first storage 1321 and/or data in the second storage 1322, the processor 1350 is further configured to: receive a fourth message transmitted by the network side device in a process of updating the RAN notification area in a case that the terminal is in the inactive state, wherein the inactive-state DRX parameter is carried in the fourth message; or receive the fourth message transmitted by the network side device in the random access procedure in a case that the terminal is in the inactive state, wherein the inactive-state DRX parameter is carried in the fourth message; or receive the RAN paging message transmitted by the network side device in a case that the terminal is in the inactive state, wherein the inactive-state DRX parameter is carried in the RAN paging message; or receive a handover command transmitted by the network side device in a case that the terminal is in a RRC connected state, wherein the inactive-state DRX parameter is carried in the handover command.

Specifically, by calling a software program and/or a module stored in the first storage 1321 and/or data in the second storage 1322, the processor 1350 is further configured to: in a case that the terminal is in the inactive state, prior to receiving the fourth message transmitted by the network side device in the process of updating the RAN notification area, transmit the first message to the network side device in a case that the terminal is in the inactive state and the RAN notification area needs to be updated; receive the second message returned by the network side device; and transmit, to the network side device, the third message for indicating that the RAN notification area needs to be updated. Here, RAN notification area configuration information is further carried in the fourth message received by the processor 1350 in the process of updating the RAN notification area.

Specifically, by calling a software program and/or a module stored in the first storage 1321 and/or data in the second storage 1322, the processor 1350 is further configured to: in a case that the terminal is in the inactive state, prior to receiving the fourth message transmitted by the network side device in the random access procedure, receive the RAN paging message transmitted by the network side device in a case that the terminal is in the inactive state; transmit the first message to the network side device; receive the second message returned by the network side device; and transmit the third message to the network side device.

Specifically, by calling a software program and/or a module stored in the first storage 1321 and/or data in the second storage 1322, the processor 1350 is further configured to: in a case that the terminal is in the inactive state, after receiving the RAN paging message transmitted by the network side device, transmit, to the network side device, an acknowledgement message for indicating that receipt of the inactive-state DRX parameter by the terminal is successful.

Specifically, by calling a software program and/or a module stored in the first storage 1321 and/or data in the second storage 1322, the processor 1350 is further configured to: transmit the first message to the network side device, wherein the first message is configured to indicate to the network side device that receipt of the inactive-state DRX parameter by the terminal is successful.

Specifically, by calling a software program and/or a module stored in the first storage 1321 and/or data in the second storage 1322, the processor 1350 is further configured to: transmit the first message to the network side device through the Physical Random Access CHannel (PRACH) resource indicated by the RAN paging message; or transmit the first message to the network side device through the PRACH resource indicated by a broadcast of the network side device; or transmit the first message to the network side device through the reserved PRACH resource.

Here, the PRACH resource includes: a preamble of the PRACH and/or a time-frequency resource of the RPACH.

The terminal device of the present disclosure acquires, according to the message transmitted by the network side device, the inactive-state DRX parameter configured by the network side device for the terminal, thereby maintaining locally the inactive-state-related DRX parameter in the DRX parameter configuration, so that the terminal in the inactive state may perform discontinuous reception according to the received inactive-state DRX parameter, thereby achieving the purpose of saving power consumption of the terminal.

Figure 14:
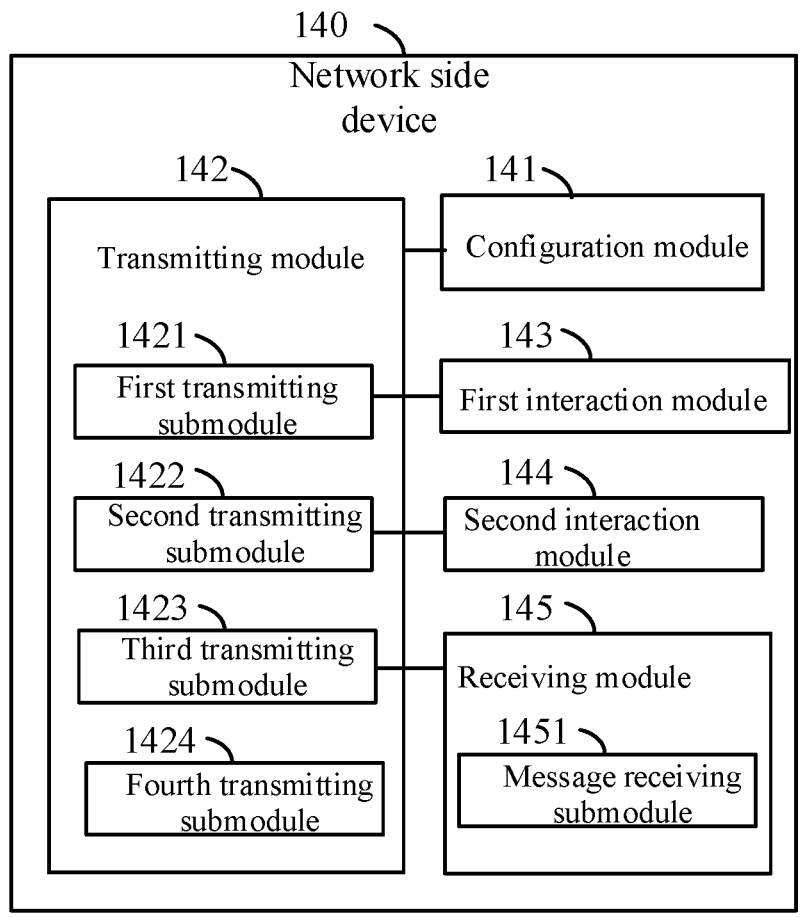
FIG. 14 is a schematic structural diagram illustrating a network side device provided by the present disclosure.

The present disclosure provides a network side device. The network side device may be a base station. As shown in FIG. 14, the network side device 140 includes: a configuration module 141, configured to configure an inactive-state DRX parameter for the terminal; and a transmitting module 142, configured to transmit a message including the inactive-state DRX parameter to the terminal.

Optionally, the transmitting module 142 includes: a first transmitting submodule 1421, configured to transmit the fourth message to the terminal in the process of updating the RAN notification area in a case that the terminal is in the inactive state, wherein the inactive-state DRX parameter is carried in the fourth message; or a second transmitting submodule 1422, configured to transmit the fourth message to the terminal in the random access procedure in a case that the terminal is in the inactive state, wherein the inactive-state DRX parameter is carried in the fourth message; or a third transmitting submodule 1423, configured to transmit a RAN paging message to the terminal in a case that the terminal is in the inactive state, wherein the inactive-state DRX parameter is carried in the RAN paging message; or a fourth transmitting submodule 1424, configured to transmit a handover command to the terminal in a case that the terminal is in the RRC connected state, wherein the inactive-state DRX parameter is carried in the handover command.

Optionally, the network side device 140 further includes: a first interaction module 143, configured to: prior to transmitting, by the first transmitting submodule, the fourth message, receive the first message transmitted by the terminal in a case that the terminal is in the inactive state and the RAN notification area needs to be updated; transmit the second message to the terminal; and receive the third message, transmitted by the terminal, for indicating that the RAN notification area needs to be updated.

Information for configuring a RAN notification area is also carried in the fourth message transmitted in a process of updating the RAN notification area.

Optionally, the network side device 140 further includes: a second interaction module 144, configured to: prior to transmitting, by the second transmitting submodule, the fourth message, transmit the RAN paging message to the terminal in a case that the terminal is inactive; receive the first message transmitted by the terminal; transmit the second message to the terminal; and receive the third message transmitted by the terminal.

Optionally, the network side device 140 further includes: a receiving module 145, configured to: after transmitting, by the third transmitting submodule to the terminal, the RAN paging message, receive an acknowledgement message, transmitted by the terminal, for indicating that receipt of the inactive-state DRX parameter by the terminal is successful.

Optionally, the receiving module 145 may include: a message receiving submodule 1451, configured to: after transmitting, by the third transmitting submodule to the terminal, a RAN paging message, receive the first message transmitted by the terminal, wherein the first message is configured to indicate, to the network side device, that receipt of the inactive-state DRX parameter by the terminal is successful.

Optionally, the message receiving submodule 1451 is specifically configured to receive the first message transmitted by the terminal through the Physical Random Access CHannel (PRACH) resource indicated by the RAN paging message; or receive the first message transmitted by the terminal through the PRACH resource indicated by a broadcast of the network side device; or receive, through the reserved PRACH resource, the first message transmitted by the terminal.

The PRACH resource includes: a preamble of the PRACH and/or a time-frequency resource of the PRACH.

The method of configuring a discontinuous reception parameter, a terminal and a network side device provided by the present disclosure enable the terminal to acquire, according to the message transmitted by the network side device, the inactive-state DRX parameter configured by the network side device for the terminal, so that the terminal in the inactive state may perform discontinuous reception according to the inactive-state DRX parameter, thereby achieving the purpose of saving power consumption of the terminal.

The present disclosure also provides a network side device including a storage and a processor, wherein the storage includes a computer program stored on the storage and is executable by the processor; in a case that the computer program is executed by the processor, the processor implements the foregoing various processes in the embodiments of the method of configuring the DRX parameters at the network side device, and may achieve the same technical effect, and will not be described herein to avoid repetition.

The present disclosure also provides a computer readable storage medium, wherein the computer readable storage medium stores a computer program thereon; in a case that the computer program is executed by a processor, the processor implements the foregoing various steps in the embodiments of the method of configuring the DRX parameter at the network side device, and may achieve the same technical effect, and will not be described herein to avoid repetition. The computer readable storage medium may be volatile or non-volatile, such as a Read-Only Memory (ROM), a Random Access Memory (RAM), a disk, or a CD, etc.

Figure 15:
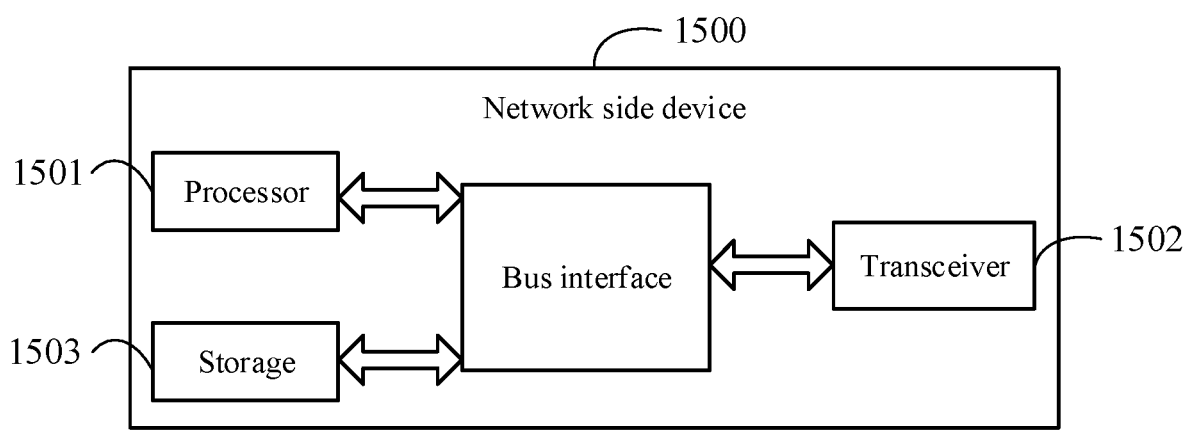
FIG. 15 is another schematic structural diagram illustrating a network side device provided by the present disclosure.

FIG. 15 is a structural diagram illustrating a network side device of the present disclosure, which may implement the details of the method of configuring the DRX parameters applied to the network side device, and achieve the same effect. As shown in FIG. 15, the network side device 1500 includes: a processor 1501, a transceiver 1502, a storage 1503, and a bus interface, wherein, the processor 1501 is configured to read a program in the storage 1503, and perform the following processes: configuring the inactive-state DRX parameter for the terminal; and transmitting a message including the inactive-state DRX parameter to the terminal.

In FIG. 15, a bus architecture may include any number of interconnected buses and bridges, specifically links together various circuits such as one or more processors represented by the processor 1501 and a storage represented by the storage 1503. The bus architecture may also link various other circuits such as peripheral devices, voltage regulators, and power management circuits, etc., which are well known in the art and, therefore, will not be further described herein. The bus interface provides an interface. The transceiver 1502 may be a plurality of components, including a transmitter and a receiver, may provide units for communicating with various other devices on a transmission medium.

The processor 1501 is responsible for managing a bus architecture and general processing, and the storage 1503 may store data used by the processor 1501 in a case that the processor 1501 performs operations.

Optionally, by reading a program in the storage 1503, the processor 1501 is further configured to: transmit the fourth message to the terminal in the process of updating the RAN notification area in a case that the terminal is in the inactive state, wherein the inactive-state DRX parameter is carried in the fourth message; or, transmit the fourth message to the terminal in the random access procedure in a case that the terminal is in the inactive state, wherein the inactive-state DRX parameter is carried in the fourth message; or, transmit a RAN paging message to the terminal in a case that the terminal is in the inactive state, wherein the inactive-state DRX parameter is carried in the RAN paging message; or transmit a handover command to the terminal in a case that the terminal is in the RRC connected state, wherein the inactive-state DRX parameter is carried in the handover command.

Optionally, by reading a program in the storage 1503, the processor 1501 is configured to: prior to transmitting the fourth message to the terminal in the process of updating the RAN notification area in a case that the terminal is in the inactive state, receive the first message transmitted by the terminal in a case that the terminal is in the inactive state and the RAN notification area needs to be updated; transmit the second message to the terminal; and receive the third message, transmitted by the terminal, for indicating that the RAN notification area needs to be updated.

The information for configuring the RAN notification area is also carried in the fourth message transmitted in the process of updating the RAN notification area.

Optionally, by reading a program in the storage 1503, the processor 1501 is configured to: prior to the transmitting the fourth message to the terminal in a random access procedure in a case that the terminal is in the inactive state, transmit the RAN paging message to the terminal in a case that the terminal is inactive; receive the first message transmitted by the terminal; transmit the second message to the terminal; and receive the third message transmitted by the terminal.

Optionally, the processor 1501 reads the program in the storage 1503 and performs the following process: in a case that the terminal is in the inactive state, after transmitting the RAN paging message to the terminal, receiving an acknowledgement message, transmitted by the terminal, for indicating that receipt of the inactive-state DRX parameter by the terminal is successful.

Optionally, the processor 1501 reads the program in the storage 1503 and performs the following process: receiving the first message transmitted by a terminal, wherein the first message is configured to indicate to the network side device that receipt of the inactive-state DRX parameter by the terminal is successful.

Optionally, the processor 1501 reads the program in the storage 1503 and performs the following process: receiving the first message transmitted by the terminal through a Physical Random Access CHannel PRACH resource indicated by the RAN paging message; or receiving the first message transmitted by the terminal through the PRACH resource indicated by a broadcast of the network side device; or receiving, through the reserved PRACH resource, the first message transmitted by the terminal.

The PRACH resource includes: a preamble of the PRACH and/or a time-frequency resource for the PRACH.

The network side device of the present disclosure, by transmitting the inactive-state DRX parameter, enables the terminal to locally maintain the inactive-state-related DRX parameter in the DRX parameter configuration, so that the terminal may, when entering the inactive state, perform discontinuous reception according to the received inactive-state DRX parameter, thereby achieving the purpose of saving power consumption of the terminal.

Various embodiments in the present specification are described in a progressive manner, and each embodiment focuses on differences from other embodiments, and the same or similar parts between the various embodiments may be obtained by referring to each other.

Those skilled in the art will appreciate that the present disclosure may be provided as a method, an apparatus, or a computer program product. Accordingly, the present disclosure may take forms of an entire hardware embodiment, an entire software embodiment, or an embodiment combining software and hardware aspects. Moreover, the present disclosure may take a form of a computer program product implemented by one or more computer usable storage medium (including, but not limited to, a disk storage, a CD-ROM, an optical storage, etc.) including a computer usable program code thereon.

The present disclosure is described with reference to a flowchart and/or a block diagram of a method, a terminal device (a system) and a computer program product according to the present disclosure. It will be understood that each flow and/or each block of the flowchart and/or the block diagram and a combination of the flow and/or the block in the flowchart and/or block diagram may be implemented by computer program instructions. These computer program instructions may be provided to a processor of a general purpose computer, a special purpose computer, an embedded processing machine or other programmable data processing terminal device to produce a machine, so that, by executing instructions executed by a processor of a computer or other programmable data processing terminal device, a device for implementing functions designated in one or more flows of the flowchart or one or more blocks of the block diagram may be generated.

The computer program instructions may also be stored in a computer readable storage that may direct a computer or other programmable data processing terminal device to operate in a particular manner, such that instructions stored in the computer readable storage produce an article of manufacture including an instruction device, and the instruction device implements the functions designated in one or more flows of the flowchart or in one or more blocks of the block diagram.

These computer program instructions may also be loaded onto a computer or other programmable data processing terminal device such that a series of operational steps are performed on the computer or other programmable terminal device to produce a computer-implemented processing, such that the instructions executed on a computer or other programmable terminal device provide steps for implementing the functions designated in one or more flows of the flowchart or in one or more blocks of the block diagram.

Although optional embodiments of the present disclosure are already described, one of ordinary skills in the art may make additional modifications and alterations to these embodiments once one of ordinary skills in the art understands a basic creative concept. Therefore, the appended claims are intended to be construed as including optional embodiments and all changes and modifications that fall within the scope of the present disclosure.

It should also be noted that, in the present disclosure, relational terms such as first and second, etc. are used merely to distinguish one entity or operation from another entity or operation, without necessarily requiring or implying any such actual relationship or order between these entities or operations. Furthermore, the terms "comprises" or "comprising" or "includes" or any other variations are intended to encompass a non-exclusive inclusion, such that a process, a method, an article, or a terminal device that includes a series of elements includes not only those elements but also other elements not explicitly listed, or elements inherent to such a process, method, article, or terminal device. An element defined by such a phrase as "comprising a . . . " does not exclude presence of additional identical elements in the process, method, article, or terminal device including the element, if without further limitation.

The above are optional embodiments of the present disclosure. It should be noted that the improvements and embellishments may be made by one of ordinary skills in the art without departing the principles of the present disclosure. These improvements and embellishments are also within the protection scope of the present disclosure.

What is claimed is:

1. A method of configuring a discontinuous reception (DRX) parameter, applied to a terminal, comprising:
   receiving a message transmitted by a network side device; and
   acquiring, from the message, an inactive-state DRX parameter configured by the network side device for the terminal, wherein,
receiving the message transmitted by the network side device, comprises:
receiving, in a process of updating a Radio Access Network (RAN) notification area, a fourth message transmitted by the network side device, in a case that the terminal is in an inactive state, wherein the inactive-state DRX parameter is carried in the fourth message.

2. The method according to claim 1, wherein, prior to receiving, in the process of updating the RAN notification area, the fourth message transmitted by the network side device in a case that the terminal is in the inactive state, the method further comprises:
transmitting a first message to the network side device in a case that the terminal is in the inactive state and the RAN notification area needs to be updated;
receiving a second message returned by the network side device; and
transmitting, to the network side device, a third message indicating that the RAN notification area needs to be updated.

3. The method according to claim 2, wherein,
transmitting the first message to the network side device comprises transmitting a random access preamble to the network side device;
receiving the second message returned by the network side device comprises receiving a random access response (RAR) transmitted by the network side device.

4. The method according to claim 1, wherein, information for configuring the RAN notification area is further carried in the fourth message received by the terminal in the process of updating the RAN notification area.

5. A method of configuring a discontinuous reception (DRX) parameter, applied to a network side device, comprising:
configuring an inactive-state DRX parameter for a terminal; and
transmitting a message comprising the inactive-state DRX parameter to the terminal,
wherein,
transmitting the message comprising the inactive-state DRX parameter to the terminal, comprises:
transmitting a fourth message to the terminal in a process of updating a Radio Access Network (RAN) notification area in a case that the terminal is in an inactive state, wherein the inactive-state DRX parameter is carried in the fourth message.

6. The method according to claim 5, wherein, prior to transmitting the fourth message to the terminal in the process of updating the RAN notification area in a case that the terminal is in the inactive state, the method further comprises:

receiving a first message transmitted by the terminal in a case that the terminal is in the inactive state and the RAN notification area needs to be updated;
transmitting a second message to the terminal; and
receiving a third message transmitted by the terminal, the third message indicating that the RAN notification area needs to be updated.

7. The method according to claim 5, wherein information for configuring the RAN notification area is further carried in the fourth message transmitted by the network side device in the process of updating the RAN notification area.

8. A terminal, comprising:
a storage and a processor, wherein a computer program executable by the processor is stored in the storage, and in a case that the computer program is executed by the processor, the processor is configured to implement:
receiving a message transmitted by a network side device; and
acquiring, from the message, an inactive-state DRX parameter configured by the network side device for the terminal,
wherein,
receiving the message transmitted by the network side device, comprises:
receiving, in a process of updating a Radio Access Network (RAN) notification area, a fourth message transmitted by the network side device, in a case that the terminal is in an inactive state, wherein the inactive-state DRX parameter is carried in the fourth message.

9. The terminal according to claim 8, wherein, prior to receiving, in the process of updating the RAN notification area, the fourth message transmitted by the network side device in a case that the terminal is in the inactive state, the processor further implements:
transmitting a first message to the network side device in a case that the terminal is in the inactive state and the RAN notification area needs to be updated;
receiving a second message returned by the network side device; and
transmitting, to the network side device, a third message indicating that the RAN notification area needs to be updated.

10. The terminal according to claim 9, wherein,
transmitting the first message to the network side device comprises transmitting a random access preamble to the network side device;
receiving the second message returned by the network side device comprises receiving a random access response (RAR) transmitted by the network side device.

11. The terminal according to claim 8, wherein, information for configuring the RAN notification area is further carried in the fourth message received by the terminal in the process of updating the RAN notification area.

* * * * *